(12) United States Patent
Yang

(10) Patent No.: US 12,469,239 B2
(45) Date of Patent: Nov. 11, 2025

(54) DATA PROCESSING METHOD AND APPARATUS, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventor: Zejun Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 253 days.

(21) Appl. No.: 18/321,892

(22) Filed: May 23, 2023

(65) Prior Publication Data
US 2023/0290101 A1 Sep. 14, 2023

Related U.S. Application Data

(63) Continuation of application No. PCT/CN2022/126921, filed on Oct. 24, 2022.

(30) Foreign Application Priority Data

Oct. 27, 2021 (CN) .......................... 202111256971.9

(51) Int. Cl.
G06T 19/20 (2011.01)
G06T 7/20 (2017.01)
(Continued)

(52) U.S. Cl.
CPC ................ *G06T 19/20* (2013.01); *G06T 7/20* (2013.01); *G06T 7/73* (2017.01); *G06V 10/761* (2022.01);
(Continued)

(58) Field of Classification Search
None
See application file for complete search history.

(56) References Cited

U.S. PATENT DOCUMENTS 11,257,586 B2 * 2/2022 Karanam ................ G06V 20/64
11,410,402 B2 * 8/2022 Reddi ..................... G06T 17/00
(Continued)

FOREIGN PATENT DOCUMENTS

CN 108227931 A 6/2018
CN 112614214 A 4/2021
(Continued)

OTHER PUBLICATIONS

The European Patent Office (EPO) The Extended European Search Report for Application No. 22885841.1 Sep. 16, 2024 9 Pages.

(Continued)

*Primary Examiner* — Ryan M Gray
(74) *Attorney, Agent, or Firm* — Anova Law Group, PLLC

(57) ABSTRACT

Embodiments of this application provide a data processing method and apparatus, an electronic device, and a computer-readable storage medium. The method includes obtaining a target video of a target object; determining three-dimensional attitude angles of target joint points of the target object in each frame of image of the target video, and first three-dimensional coordinates of a first joint point and a second joint point corresponding to each frame of image in a first coordinate system corresponding to a virtual object; determining a displacement deviation of the second joint point; correcting the first three-dimensional coordinates of the first joint point according to the first three-dimensional coordinates and the historical three-dimensional coordinates of the second joint point to obtain a target three-dimensional
(Continued)

coordinates of the first joint point; and determining a three-dimensional attitude of the virtual object.

20 Claims, 12 Drawing Sheets

(51) Int. Cl.
 G06T 7/73 (2017.01)
 G06V 10/74 (2022.01)
 H04N 13/207 (2018.01)
(52) U.S. Cl.
 CPC . *H04N 13/207* (2018.05); *G06T 2207/20044* (2013.01); *G06T 2207/30241* (2013.01); *G06T 2219/2004* (2013.01)

(56) References Cited

U.S. PATENT DOCUMENTS

| | | | | |
|---|---|---|---|---|
| 11,468,612 | B2* | 10/2022 | Wang | G06V 40/10 |
| 11,823,498 | B1* | 11/2023 | Wan | G06V 10/764 |
| 12,211,307 | B1* | 1/2025 | Batra | G06T 7/70 |
| 2010/0073361 | A1* | 3/2010 | Taylor | G06T 13/00 |
| | | | | 345/473 |
| 2016/0063713 | A1 | 3/2016 | Okamoto et al. | |
| 2018/0012407 | A1* | 1/2018 | Chuang | G06T 13/40 |
| 2020/0098177 | A1 | 3/2020 | Ni et al. | |
| 2020/0178851 | A1* | 6/2020 | Singhose | A61B 5/1128 |
| 2021/0074006 | A1 | 3/2021 | Wang et al. | |
| 2021/0158107 | A1* | 5/2021 | Karanam | G16H 30/20 |
| 2021/0209788 | A1 | 7/2021 | Kim et al. | |
| 2022/0108468 | A1* | 4/2022 | Nakamura | G06T 7/73 |
| 2022/0198682 | A1* | 6/2022 | Oh | G06T 7/75 |
| 2024/0169638 | A1* | 5/2024 | Ohashi | G06T 19/00 |
| 2024/0303859 | A1* | 9/2024 | Nakamura | G06T 7/251 |

FOREIGN PATENT DOCUMENTS

| | | |
|---|---|---|
| CN | 112950751 A | 6/2021 |
| CN | 113706699 A | 11/2021 |
| KR | 20160138729 A | 12/2016 |
| KR | 20210011985 A | 2/2021 |
| WO | 2017012361 A1 | 1/2017 |

OTHER PUBLICATIONS

Dushyant Mehta et al. "Xnect: Real-time multi-person 3d human pose estimation with a single rgb camera." arXiv preprint arXiv:1907.00837 (2019).

The World Intellectual Property Organization (WIPO) International Search Report for PCT/CN2022/126921 Jan. 6, 2023 5 Pages (including translation).

The State Intellectual Property Office of the People's Republic of China (SIPO) Office Action 1 for 202111256971.9 Dec. 23, 2021 7 Pages (including translation).

Dimitrios S. Alexiadis et al., "An Integrated Platform for Live 3D Human Reconstruction and Motion Capturing", "IEEE Transactions on Circuits and Systems for Video Technology", vol. 27, issue 4, Apr. 30, 2017.

Rong Y. Rong et al., FrankMocap: Fast monocular 3D hand and body motion capture by regression and integration [J]. arXiv preprint arXiv:2008.08324, 2020.

Huang Z Huang et al., RIFE: Real-Time Intermediate Flow Estimation for Video Frame Interpolation[J]. arXiv preprint arXiv:2011.06294, 2020.

Hu J Hu et al., Revisiting single image depth estimation: Toward higher resolution maps with accurate object boundaries[C]//2019 IEEE Winter Conference on Applications of Computer Vision (WACV). IEEE, 2019: 1043-1051.

\* cited by examiner

DATA PROCESSING METHOD AND APPARATUS, ELECTRONIC DEVICE, AND COMPUTER-READABLE STORAGE MEDIUM

RELATED APPLICATIONS

This application is a continuation of PCT Application No. PCT/CN2022/126921, filed on Oct. 24, 2022, which in turn claims priority to Chinese Patent Application No. 202111256971.9, entitled "DATA PROCESSING METHOD AND APPARATUS, ELECTRONIC DEVICE, AND COMPUTER-READABLE STORAGE MEDIUM," filed to the China Patent Office on Oct. 27, 2021. The two applications are both incorporated by reference in entirety.

FIELD OF THE TECHNOLOGY

This application relates to the technical field of data processing, and in particular, to a data processing method and apparatus, an electronic device, a computer-readable storage medium, and a computer program product.

BACKGROUND OF THE DISCLOSURE

With the development of science and technology, how to determine attitudes of virtual characters through attitudes of real characters has become an important part of the development of modern industry, such as smart factories, movie and game visual effects, which is valuable for reality, immersive virtual and augmented reality, telepresence, and free viewpoint three-dimensional videos.

Often a preset motion is performed in front of an infrared light source mainly based on a wearable sensor to calculate a three-dimensional space coordinate of each reflective marker according to infrared light reflected by the reflective marker on the wearable sensor, thereby determining the attitudes of the virtual characters based on the three-dimensional space coordinate of each reflective marker.

However, this method relies on the wearable sensor, which leads to inconvenience in the movement of a person wearing the wearable sensor and affects the accuracy of the motion performed.

SUMMARY

Embodiments of this application provide a data processing method and apparatus, an electronic device, a computer-readable storage medium, and a computer program product, which can effectively improve the accuracy of an attitude of a virtual object. The technical solutions provided by the embodiments of this application are as follows.

One aspect of the embodiments of this application provides a data processing method. The method is performed by an electronic device, and includes obtaining a target video of a target object, the target video comprising at least one frame of image; determining three-dimensional attitude angles of target joint points of the target object in each frame of image, and first three-dimensional coordinates of a first joint point and a second joint point corresponding to each frame of image in a first coordinate system, the first joint point and the second joint point being among target joint points, the first coordinate system being a coordinate system corresponding to a virtual object, and the first joint point being a root node among the target joint points; determining a displacement deviation of the second joint point according to the first three-dimensional coordinates of the second joint point corresponding to each frame of image and a historical three-dimensional coordinates corresponding to a previous frame of image relative to each frame of image; correcting the first three-dimensional coordinates of the first joint point according to the first three-dimensional coordinates and the historical three-dimensional coordinates of the second joint point in response to the displacement deviation being less than or equal to a threshold, to obtain a target three-dimensional coordinates of the first joint point; and determining a three-dimensional attitude of the virtual object corresponding to each frame of image according to the target three-dimensional coordinates of the first joint point and the three-dimensional attitude angles of the target joint points in each frame of image.

Another aspect of this application provides a data processing system. The data processing system includes an image acquisition apparatus, a data processing device, and a terminal device.

The image acquisition apparatus is configured to obtain a target video of a target object. The target video includes at least one frame of image.

The data processing device is configured to perform, based on the target video acquired by the image acquisition apparatus, a method to obtain a three-dimensional attitude of a virtual object, associated with the target object, corresponding to each frame of image of the target video, and transmit the obtained three-dimensional attitude to the terminal device. The method includes obtaining a target video of a target object, the target video comprising at least one frame of image; determining three-dimensional attitude angles of target joint points of the target object in each frame of image, and first three-dimensional coordinates of a first joint point and a second joint point corresponding to each frame of image in a first coordinate system, the first joint point and the second joint point being among target joint points, the first coordinate system being a coordinate system corresponding to a virtual object, and the first joint point being a root node among the target joint points; determining a displacement deviation of the second joint point according to the first three-dimensional coordinates of the second joint point corresponding to each frame of image and a historical three-dimensional coordinates corresponding to a previous frame of image relative to each frame of image; correcting the first three-dimensional coordinates of the first joint point according to the first three-dimensional coordinates and the historical three-dimensional coordinates of the second joint point in response to the displacement deviation being less than or equal to a threshold, to obtain a target three-dimensional coordinates of the first joint point; and determining a three-dimensional attitude of the virtual object corresponding to each frame of image according to the target three-dimensional coordinates of the first joint point and the three-dimensional attitude angles of the target joint points in each frame of image.

The terminal device is configured to drive the virtual object to perform a corresponding motion based on the obtained three-dimensional attitude.

Another aspect of this application provides an electronic device including a memory, a processor, and a computer program stored on the memory. The processor executes the computer program to implement the steps of the foregoing data processing method.

BRIEF DESCRIPTION OF THE DRAWINGS

To describe the technical solutions in the embodiments of this application more clearly, the following briefly introduces the accompanying drawings required for describing the embodiments of this application.

DESCRIPTION OF EMBODIMENTS

Figure 1:
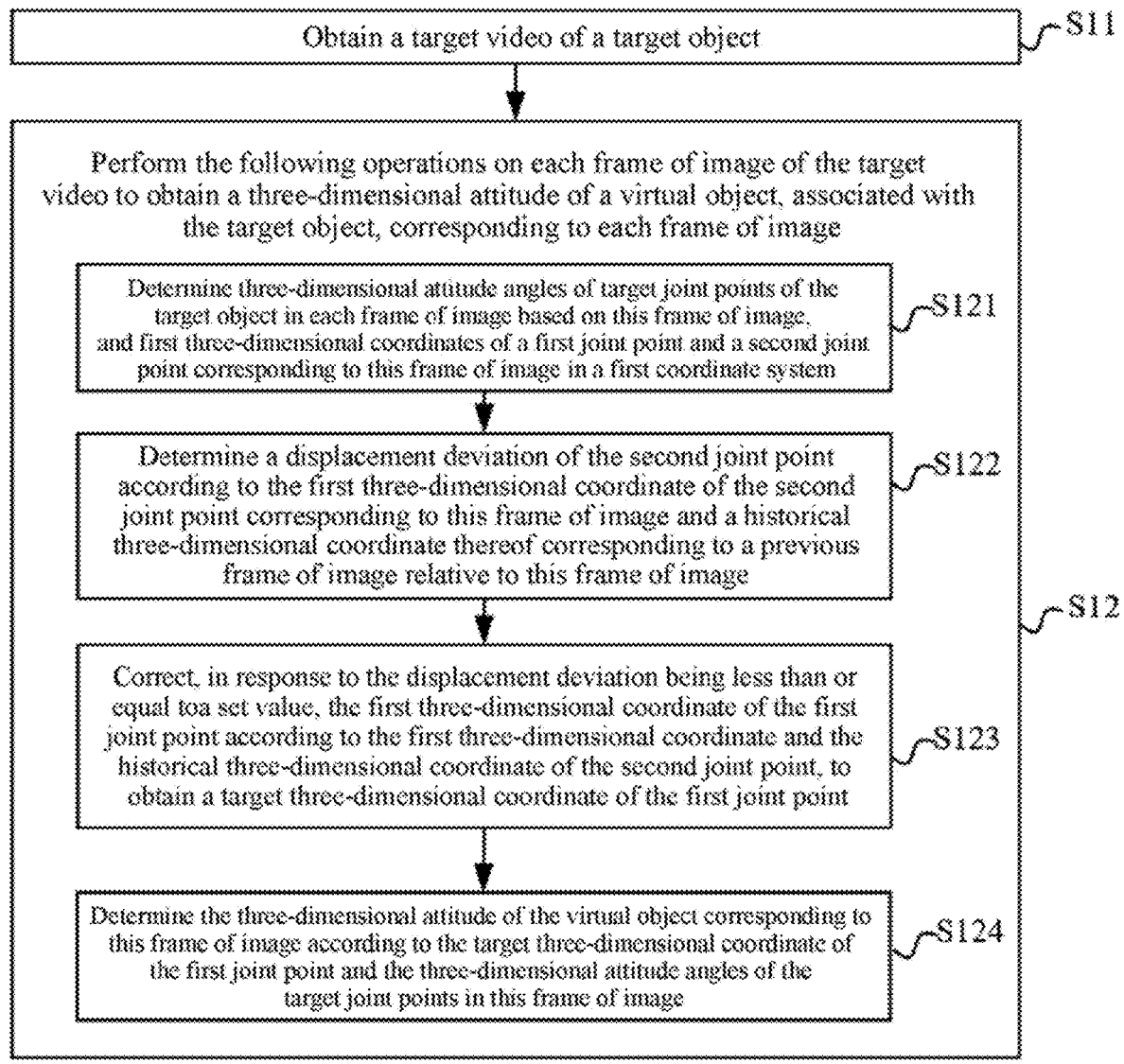
FIG. 1 is a flowchart of a data processing method according to an embodiment of this application.

Embodiments of this application are described below in connection with the accompanying drawings in this application. It is to be understood that the implementations set forth below in connection with the accompanying drawings are exemplary descriptions for purposes of explaining the technical solutions of the embodiments of this application and are not limiting of the technical solutions of the embodiments of this application.

A person skilled in the art may understand that as used herein, the singular forms "a/an", "one", "the", and "this" are intended to include the plural forms as well, unless expressly stated otherwise. It is to be further understood that the terms "include" and/or "contain", used in the embodiments of this application, mean that the corresponding features may be implemented as presented features, information, data, steps, operations, elements, and/or components, but the implementation as other features, information, data, steps, operations, elements, components, and/or combinations thereof, etc. as may be supported by the technical field is not precluded. It is to be understood that when an element is referred to as being "connected" or "coupled" to another element, the element may be directly connected or coupled to another element, or the element may be connected to another element through intervening elements. Furthermore, "connected" or "coupled" as used herein may include wirelessly connected or wirelessly coupled. The term "and/or" as used herein indicates at least one of the items defined by the term. For example, "A and/or B" indicates being implemented as "A", or being implemented as "A", or being implemented as "A and B".

To make the objectives, technical solutions, and advantages of this application clear, the following further describes implementations of this application in detail with reference to the accompanying drawings.

A data processing method according to an embodiment of this application may be implemented based on artificial intelligence (AI) technology. For example, three-dimensional attitude angles of target joint points of a target object in each frame of image of a target video may be obtained by invoking a three-dimensional attitude estimation model. AI is a theory, method, technology, and application system that utilizes a digital computer, or a machine controlled by the digital computer to simulate, extend, and expand human intelligence, perceive the environment, obtain knowledge, and use the knowledge to obtain optimal results.

The three-dimensional attitude estimation model may be a neural network model based on computer vision (CV). The CV refers to: identifying, tracking, and measuring targets using cameras and computers instead of human eyes, and further performing graphics processing, whereby computer-processed images are more suitable for human observation or transfer to instruments for detection.

In some embodiments, the data processing method involved in this embodiment may be implemented based on cloud technology. For example, when training the neural network model to obtain the three-dimensional attitude estimation model, the cloud technology may be used, and data computing involved in the training process may be performed by cloud computing.

Cloud technology refers to hosting technology, which unifies a series of resources, such as hardware, software, and networks, and realizes the computation, storage, processing, and sharing of data in a wide area network or a local area network. Cloud computing refers to the delivery and use mode of IT infrastructure, and refers to obtaining required resources through the network in an on-demand and expandable manner.

In order to better explain and understand the solutions provided by this embodiment, some relevant technical terms involved in this embodiment are first introduced:

Motion Capture (Mocap): The motion capture is also referred to as dynamic capture, simply as "Mocap", which refers to a technology for recording and processing the motion of a person or other objects, primarily for use in animation/movie production, large games, or virtual reality. According to different working principles, Mocap devices may be divided into mechanical, acoustic, optical, electromagnetic, inertial, and other categories. At present, based on optical Mocap, an actor who needs to perform motion wears a wearable sensor with several markers, capture the positions of the markers through a dense camera array, restore and render the positions of the markers to a virtual object, and finally realize the mapping of motion performance of a real actor to skeletal animations.

Three-dimensional Attitude Estimation: The three-dimensional attitude estimation refers to predicting, based on a depth neural network, coordinates of joint points of a human body in a three-dimensional space from an image including an attitude of the human body, to restore an attitude of the human body.

Video Frame Supplementation: The video frame supplementation refers to a technology for increasing a total frame number of a video by generating a transition frame between two consecutive frames in the video without changing a total length of the video, to improve a video frame rate.

Monocular Depth Estimation: The monocular depth estimation refers to a depth learning method for predicting a distance between each pixel point in an image and a camera using a single image.

Aircraft Attitude Angle: The aircraft attitude angle is determined by a relationship between a body coordinate system and a geographic coordinate system, and is represented by three Euler angles, namely a heading/yaw angle, a pitch angle, and a roll angle. Different rotation orders of the body form different coordinate conversion matrices, and the spatial rotation of the body coordinate system relative to the geographical coordinate system is usually represented in the order of the heading angle, the pitch angle, and the roll angle. In the three-dimensional human body attitude/pose estimation, the aircraft attitude angles can be used in a similar way to represent rotational angles of each joint of the human body against different rotational axes in the coordinate system, hereinafter also referred to as three-dimensional attitude angles of a joint point.

Savitzky-Golay Filter: The filter refers to a filter for fitting polynomial data in a time domain based on a local polynomial least square method. The filter may ensure the shape and width of a signal unchanged while filtering noise.

Skinned Multi-Person Linear eXpressive (SMPL-X) Model or Skinned Multi-Person Linear (SMPL) Model: The model refers to a 3D model that calculates a body attitude, a hand attitude, and a facial expression from a single frame of RGB image, and generally uses three parameters to control a body joint attitude, a body type, and a facial expression, respectively.

For motion capture, the existing methods require a performer to wear a specified wearable device, such as various sensors, resulting in the inconvenience of movement of the performer, and affecting the accuracy of a preset motion performed by the performer. Moreover, the methods have higher requirements for the acquisition site and higher implementation costs, skilled technicians are required to be skilled in the use of such a motion capture system, resulting in a higher use threshold of the motion capture system. In addition, the methods need to acquire information of multiple markers on the wearable sensor worn by the performer to realize the final motion capture and determine an attitude of a virtual object corresponding to the performer. Therefore, the motion capture mode has a high complexity, the accuracy of the determined attitude of the virtual object is also low, and the requirements cannot be met.

In view of this, this embodiment provides a data processing method. By correcting a first three-dimensional coordinates of a first joint point capable of controlling an overall position of a virtual object, the problem that the behavior of the virtual object is not real and natural due to an erroneous movement of a target object can be avoided. For example, when the virtual object moves, a foot float or a slip occurs. Furthermore, according to a target three-dimensional coordinates and a historical three-dimensional coordinates of the first joint point and three-dimensional attitude angles of target joint points in this frame of image, a three-dimensional attitude of the virtual object corresponding to this frame of image may be determined more accurately, whereby the motion of the virtual object is more accurate, the movement is more natural and smooth, the real sense of the behavior of the virtual object is improved, and the virtual object is effectively driven to restore a real movement trajectory of a target object.

The method according to this embodiment may be applied to any application scenario that requires control of a three-dimensional attitude of a virtual object based on a three-dimensional attitude of a target object (for example, represented as three-dimensional attitude angles and three-dimensional coordinates). For example, the method may be applied to drive game character movements in various games, to create fantasy movies/TV series/animations, virtual reality, etc. based on motions performed by actors in reality.

The technical solutions of this embodiment and the technical effects produced by the technical solutions of this application are described below by describing several exemplary implementations. The following implementations may be referred to, learned from, or combined with each other, and the description of the same terms, similar features, and similar implementation steps in different implementations will not be repeated.

FIG. 1 is a flowchart of a data processing method according to an embodiment of this application. An execution entity of the data processing method may be an electronic device. In a possible implementation, the electronic device may include, but is not limited to, a terminal device or a server. In some embodiments, the server may be a cloud server. The terminal device may be user equipment (UE), a mobile device, a cellular phone, a cordless phone, a personal digital assistant (PDA), a handheld device, a computing device, or a wearable device, etc. The data processing method may be implemented by a processor invoking computer-readable instructions stored in a memory. In some embodiments, the data method may be performed by a user terminal. For example, the user terminal includes, but is not limited to, a mobile phone, a computer, an intelligent voice interaction device, an intelligent household appliance, an in-vehicle terminal, an electronic device, an AR/VR device, a virtual robot, etc.

As shown in FIG. 1, the data processing method may include step S11 to step S12.

Step S11: Obtain a target video of a target object, the target video including at least one frame of image.

In some embodiments, the target object may be any movable object, such as a person or animal capable of moving autonomously. In this application, the data processing method may be described with a person capable of moving autonomously as a target object.

The mode of obtaining a target video in this embodiment is not limited. For example, the target video may be an initial video obtained directly according to an image acquisition device, and may also be a video obtained after frame extraction processing is performed on the initial video by a pre-configured frame extraction policy in order to reduce the data processing amount and improve the data processing efficiency. The image acquisition device may include, but is not limited to, a camera, a video camera, a still camera, or other devices with an image acquisition function (such as a mobile phone or a tablet computer), etc. The image acquisition device may be a monocular image acquisition device or a binocular image acquisition device. In some embodiments, the image acquisition device may be an RGB image acquisition device.

In some embodiments, the target video may be a video obtained after performing frame extraction processing on the initial video according to a preset time interval. The preset time interval may be determined according to the total duration of the initial video, or the number of images contained in the initial video. This application is not limited thereto. For example, the preset time interval may be positively related to the total duration of the initial video, or the number of images contained in the initial video. For example, in response to that the total duration of the initial video is 1 hour, the preset time interval may be set to 1 minute, and in response to that the total duration of the initial video is 15 minutes, the preset time interval may be set to 5 seconds. The preset time interval corresponding to different target videos may also be the same, and the frame extraction policy may be different in different application scenarios.

In some embodiments, in order to complete motion capture of a target object, the target object may perform preset motions, including movements, according to use requirements. The target video may be a video acquired by the image acquisition device to perform a preset motion on the target object. The specific type of the preset motion is not limited in this application but is determined by certain requirements.

Step S12: Perform step S121 to step S124 on each frame of image of the target video to obtain a three-dimensional attitude of a virtual object, associated with the target object, corresponding to each frame of image:

Step S121: Determine three-dimensional attitude angles of target joint points of the target object in each frame of image based on this frame of image, and first three-dimensional coordinates of a first joint point and a second joint point corresponding to this frame of image in a first coordinate system.

The first joint point and the second joint point are specified joint points in multiple target joint points. The first coordinate system is a coordinate system corresponding to the virtual object. The first joint point is a root node (which may also be referred to as a central root node) in the target joint points.

Since there is a parent-child relationship between each target joint point and other target joint points, and the complexity of the parent-child relationship between a lumbar joint point and other target joint points in the target joint points is relatively low, the lumbar joint point may be selected as the first joint point in order to reduce the amount of data processing and improve the efficiency of data processing.

The second joint point, which may also be referred to as a reference joint point, refers to a target joint point having a fixed relative positional relationship with a reference plane, and may be the same as or different from the first joint point.

For example, the second joint point may be a point that falls on the reference plane. The reference plane may be the ground. For example, the second joint point of the virtual object is relatively fixed in a specified direction in the first coordinate system. Since the virtual object always has a foot in contact with the ground during walking (the foot in contact with the ground may also be referred to as a foot functioning as a gravity support, which is referred to as a gravity support foot), the second joint point may be a toe joint point.

Figure 2:
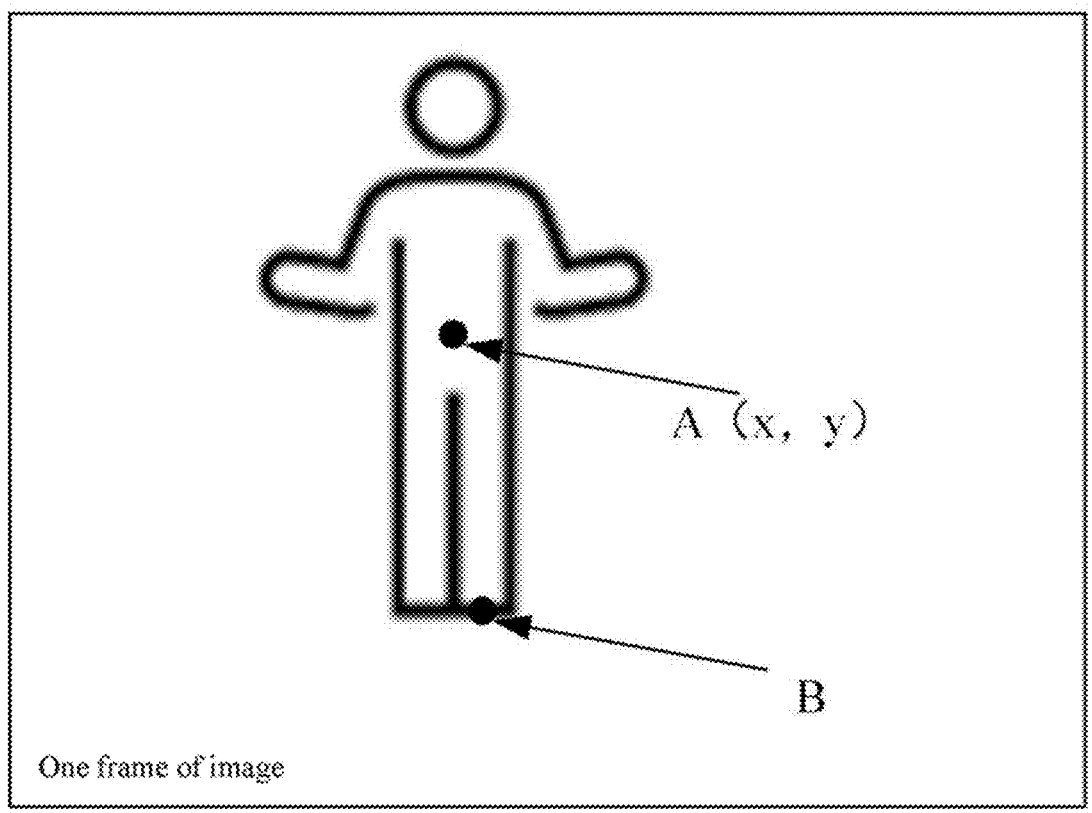
FIG. 2 shows a schematic diagram of one frame of image in a target video in an example of this application.

FIG. 2 shows a schematic diagram of one frame of image in a target video in an example of this application. As shown in FIG. 2, the first joint point A may be a lumbar joint point of the target object, and the second joint point B may be the toe joint point of the target object.

In this embodiments, the target joint points of the target object may be joint points of the target object, or some joint points selected according to application needs. For example, the target object is a person, and the target joint points may be the joint points of the person, or some specific joint points selected from the joint points of the person. How many joint points are specifically used, and which target joint points are specifically selected may be configured according to certain requirements. For example, the target object is a person, the number of target joint points may be configured to be 33, and the 33 joint points include target joint points on the torso (which may be referred to as torso joint points), hand joint points of both hands, and foot joint points of both feet.

In general, a motion using three-dimensional attitude angles of the hand joint points is relatively fine, while a motion using three-dimensional attitude angles of the foot joint points is relatively coarse, and a positional relationship of the foot joint points is relatively fixed with respect to a positional relationship of the torso joint points. Therefore, the torso joint points may include the foot joint points of both feet. That is, the target joint points may be obtained by confirming the torso joint points and the hand joint points.

In some embodiments, the torso joint points and the hand joint points may have partially overlapping joint points (certainly, there may be no overlap). For example, the torso joint points may include a left hand wrist joint point and a right hand wrist joint point. The left hand joint point may include a left hand wrist joint point, and the right hand joint point may include a right hand wrist joint point. As an example, the number of target joint points on the torso is 23, the number of left hand joint points is 6, and the number of right hand joint points is 6, out of the 33 joint points.

In some embodiments, the first three-dimensional coordinates of the first joint point and the second joint point corresponding to this frame of image in the first coordinate system may be determined according to the following steps:
determining the three-dimensional attitude angles of the target joint points in this frame of image through a three-dimensional attitude estimation model based on this frame of image;
determining a second three-dimensional coordinates of the first joint point in a second coordinate system, the second coordinate system being an image coordinate system of the target object in the target video;
determining the first three-dimensional coordinates of the first joint point according to the second three-dimensional coordinates of the first joint point and a coordinate conversion relationship, the coordinate conversion relationship being a conversion relationship between the first coordinate system and the second coordinate system; and determining the first three-dimensional coordinates of the second joint point according to the first three-dimensional coordinates of the first joint point and the three-dimensional attitude angle associated with the second joint point among the three-dimensional attitude angles of the target joint points.

In some embodiments, the first three-dimensional coordinates of the first joint point may be determined as a three-dimensional coordinates of the first joint point of the virtual object.

The three-dimensional attitude angle associated with the second joint point may be a three-dimensional attitude angle of the target joint point required in the process of tracing back from the first joint point to the second joint point according to a parent-child relationship of the target joint points.

Step S122: Determine a displacement deviation of the second joint point according to the first three-dimensional coordinates of the second joint point corresponding to this frame of image and a historical three-dimensional coordinates thereof corresponding to a previous frame of image relative to this frame of image.

In some embodiments, the displacement deviation may be a Euclidean distance between the first three-dimensional coordinates and a historical coordinate of the second joint point corresponding to this frame of image. By determining the displacement deviation, the movement distance of the second joint point of the target object between this frame of image and a previous frame of image relative to this frame of image may be determined.

Step S123: Correct, in response to the displacement deviation being less than or equal to a set value, the first three-dimensional coordinates of the first joint point according to the first three-dimensional coordinates and the historical three-dimensional coordinates of the second joint point, to obtain a target three-dimensional coordinates of the first joint point.

In some embodiments, the method may further include: taking the first three-dimensional coordinates of the first joint point as the target three-dimensional coordinates of the first joint point in response to the displacement deviation being greater than the set value.

In some embodiments, the set value may be a preset fixed value, or may be determined according to an amplitude between adjacent motions in the preset motions performed by the target object. This application is not limited thereto. For example, the set value may be set to 2-3 cm.

In a possible implementation, step S123 may include:
determining a difference in each dimension between the first three-dimensional coordinates and the historical three-dimensional coordinates of the second joint point; and
correcting, based on the difference corresponding to each dimension, a coordinate of the corresponding dimension in the first three-dimensional coordinates of the first joint point, to obtain the target three-dimensional coordinates of the first joint point.

In some embodiments, the target three-dimensional coordinates of the first joint point may be obtained by subtracting the difference corresponding to the corresponding dimension from the coordinate of each dimension in the first three-dimensional coordinates of the first joint point. A weight value corresponding to each dimension may also be determined according to a relationship between the differences corresponding to the dimensions, whereby the coordinate of the corresponding dimension in the first three-dimensional coordinates of the first joint point is weighted according to the weight value corresponding to each dimension to obtain the target three-dimensional coordinates of the first joint point. In this way, as the difference corresponding to one dimension is larger, the force with which a coordinate value in the dimension is adjusted in the first three-dimensional coordinates of the first joint point is greater.

Step S124: Determine the three-dimensional attitude of the virtual object corresponding to this frame of image according to the target three-dimensional coordinates of the first joint point and the three-dimensional attitude angles of the target joint points in this frame of image.

In some embodiments, a target three-dimensional coordinates of another joint point in this frame of image in the first coordinate system is determined according to the target three-dimensional coordinates of the first joint point and the three-dimensional attitude angle of another joint point. Another joint point is a joint point except the first joint point and the second joint point in the target joint points.

The three-dimensional attitude of the virtual object corresponding to this frame of image is determined according to the target three-dimensional coordinates of the target joint points and the three-dimensional attitude angles of the target joint points in this frame of image.

As described above, when the displacement deviation is greater than the set value, the target three-dimensional coordinates of the first joint point is determined as the first three-dimensional coordinates of the first joint point, and the target three-dimensional coordinates of the second joint point is the historical three-dimensional coordinates of the second joint point. If the displacement deviation is less than the set value in step S123, the first three-dimensional coordinates of the first joint point is corrected to obtain the target three-dimensional coordinates of the first joint point, and the target three-dimensional coordinates of the second joint point is the first three-dimensional coordinates of the second joint point.

When the three-dimensional attitude of the virtual object associated with the target object is determined based on the motion of the target object, the three-dimensional attitude of the virtual object may be determined based on the target video acquired by the image acquisition device, which is simple to realize, and can avoid wearing complicated and heavy wearable devices on the target object. The whole system is simple in operation and low in cost, and has little limitation on the limbs of the target object (such as an actor), thereby effectively solving various limitations of the traditional motion capture system, and better meeting certain requirements.

Further, according to the solution provided by this embodiment, with regard to the determination of the target three-dimensional coordinates of the root node in the target joint points, it may be determined whether to correct the first three-dimensional coordinates of the root node corresponding to a current frame based on the displacement deviation by specifying the size of the displacement deviation of the second joint point corresponding to two adjacent frames of image. The second joint point may be a specified target joint point with a fixed relative positional relationship with the ground in the first coordinate system, such as a toe joint point. By using this solution, the problem that the behavior of the virtual object is not real and natural because a floating foot or a slip occurrence in the movement due to the erroneous movement of the target object can be effectively avoided.

Based on the solution of this embodiment, the three-dimensional attitude of the virtual object may be determined more accurately by determining the target three-dimensional coordinates of the target joint points and the three-dimensional attitude angles of the target joint points in this frame of image based on the video of the target object, to improve the sense of reality of the motion performed by the virtual object, and effectively drive the virtual object to accurately restore the movement trajectory of a human body model in a three-dimensional space, whereby the motion of the virtual object is more accurate, and the movement is more natural and smooth.

Figure 3A:
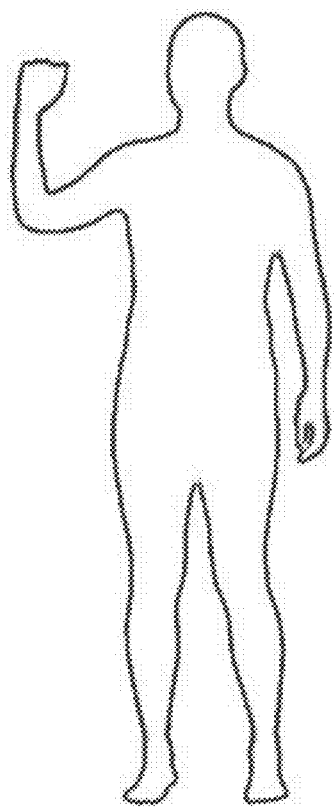
FIG. 3a shows a schematic diagram of an attitude of a target object according to an embodiment of this application.
Figure 3B:
FIG. 3b shows a schematic diagram of an attitude of a virtual object according to an embodiment of this application.

FIG. 3a shows a schematic diagram of an attitude of a target object according to an embodiment of this application. FIG. 3b shows a schematic diagram of an attitude of a virtual object according to an embodiment of this application. As shown in FIG. 3a, FIG. 3a is a human body model of a target object obtained by inputting three-dimensional attitude angles of target joint points to a SMPL-X model. The human body model presents various attitudes. As shown in FIG. 3b, a three-dimensional attitude of a virtual object corresponding to this frame of image may be determined accurately according to the attitude of the target object in this frame of image. Through the data processing method in this embodiment, the virtual object may be effectively driven, and the three-dimensional attitude of the target object may be restored.

Figure 4A:
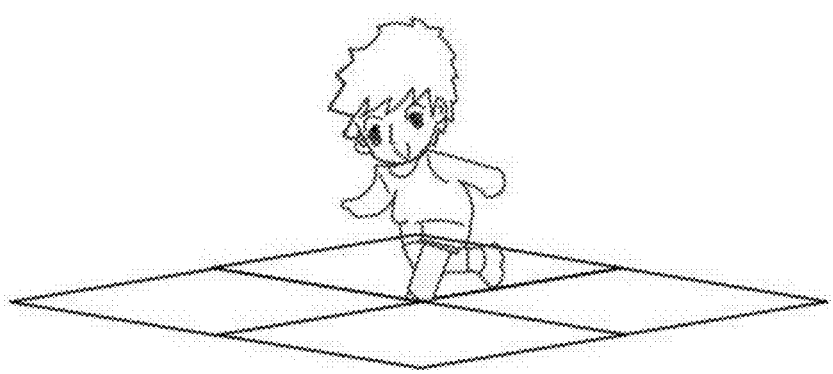
FIG. 4a shows a schematic diagram of an attitude of a virtual object determined when a first three-dimensional coordinates of a first joint point is not corrected based on a displacement deviation of a second joint point according to an embodiment of this application.
Figure 4B:
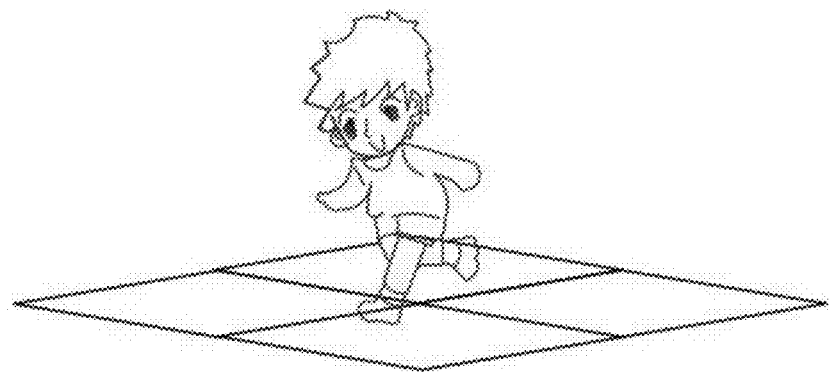
FIG. 4b shows a schematic diagram of an attitude of a virtual object determined when a first three-dimensional coordinates of a first joint point is corrected based on a displacement deviation of a second joint point according to an embodiment of this application.

FIG. 4a shows a schematic diagram of an attitude of a virtual object determined when a first three-dimensional coordinates of a first joint point is not corrected based on a displacement deviation of a second joint point according to an embodiment of this application. FIG. 4b shows a schematic diagram of an attitude of a virtual object determined when a first three-dimensional coordinates of a first joint point is corrected based on a displacement deviation of a second joint point according to an embodiment of this application. As shown in FIG. 4a, when the displacement deviation is less than the set value, if the attitude of the virtual object is determined according to the first three-dimensional coordinates of the first joint point and the three-dimensional attitude angles of the target joint points in this frame of image without correction, a foot of a virtual character may sink into the ground. As shown in FIG. 4b, by correcting the first three-dimensional coordinates of the first joint point, taking the corrected three-dimensional coordinates as the target three-dimensional coordinates of the first joint point, and further determining the three-dimensional attitude of the virtual object corresponding to this frame of image according to the target three-dimensional coordinates of the first joint point in this frame of image and the three-dimensional attitude angles of the target joint points in this frame of image, the foot of the virtual character may be moved out of the ground and "pulled out" from the ground.

In some embodiments, when determining the three-dimensional attitude angles of the target joint points in this frame of image, a torso region image and a hand region (left hand region and right hand region) image in the image may be first determined, and a three-dimensional attitude angle of a torso joint point in the torso region image and a three-dimensional attitude angle of a hand joint point in the hand region image may be determined by invoking a three-dimensional attitude estimation model.

In some embodiments, the torso region image and the hand region image in this frame of image may be determined based on detection results of a two-dimensional joint point detection model. Specifically, a target joint point in this frame of image may be detected by the two-dimensional joint point detection model, whereby this frame of image is intercepted according to the position of the target joint point in this frame of image, and the torso region image and the hand region image are intercepted.

The two-dimensional joint point detection model may be obtained by training a neural network model based on a training data set containing a large number of training samples. The specific network structure of the two-dimensional joint point detection model is not limited in this embodiment, and may be configured according to certain requirements.

In some embodiments, the three-dimensional attitude estimation model may be a model based on a convolutional neural network. For example, the three-dimensional attitude estimation model may be a neural network model including, but not limited to, a model structure based on ResNet (residual network), InceptionNet (deep learning neural network), DenseNet (dense neural network), VggNet (deep convolutional neural network), SENet (Squeeze-and-Excitation Networks), etc. The input of the model is one frame of image or image data obtained after vectorization processing of this frame of image, and the output of the model is identifiers of a joint point tree in this frame of image or multiple joint points. The output of the model may also be two-dimensional coordinates of joint points in this frame of image. The identifiers may be numbers, letters, etc. This application is not limited thereto.

In some embodiments, the two-dimensional joint point detection model may be a neural network model based on ResNet, and the neural network model may be trained by using a large number of human body joint point detection data sets to obtain the two-dimensional joint point detection model satisfying a training end condition (such as loss function convergence of the model and the detection accuracy satisfying the requirements).

Figure 5:
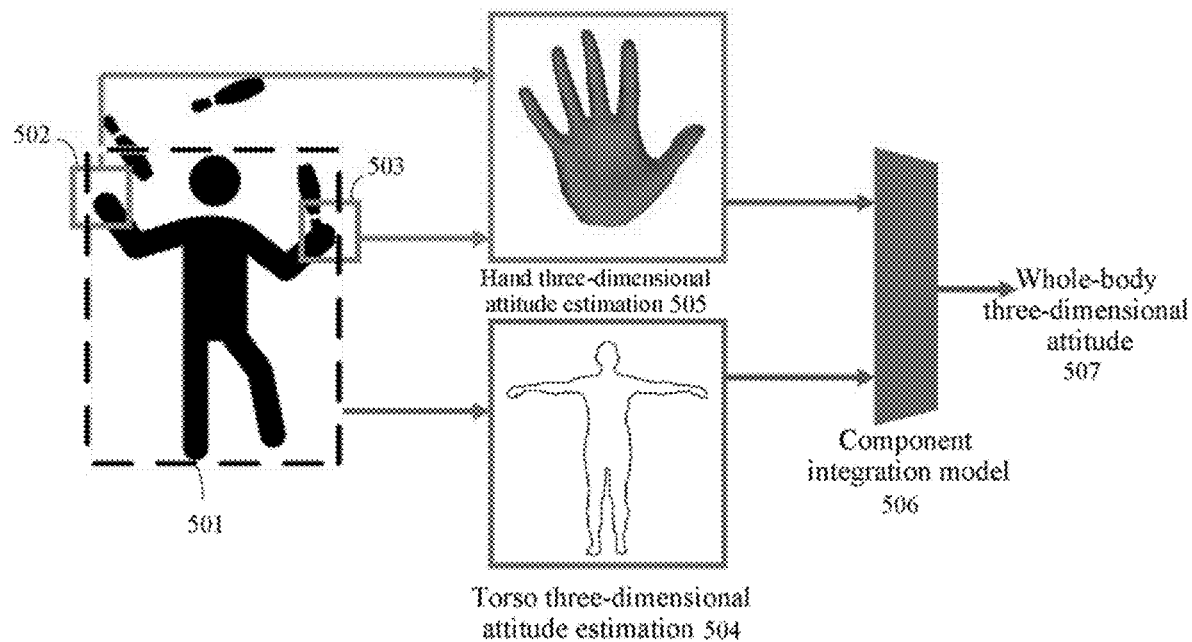
FIG. 5 shows a schematic diagram of three-dimensional attitude estimation for one frame of image according to an embodiment of this application.

FIG. 5 shows a schematic diagram of three-dimensional attitude estimation for one frame of image according to an embodiment of this application. As shown in FIG. 5, a first rectangular region (region indicated by a dotted line box 501 shown in FIG. 5) of a minimum circumscribed rectangle formed by the target joint points may be determined, a first image corresponding to the first rectangular region in this frame of image is intercepted, and the first image is taken as an image of a torso region of the target object in this frame of image.

In some embodiments, at least one second rectangular region (region indicated by solid line boxes 502 and 503 shown in FIG. 5) of a minimum circumscribed rectangle with a preset multiple may be determined by being centered on wrist joint points of both hands of the target object in this frame of image, at least one second image corresponding to the at least one second rectangular region in this frame of image is intercepted, and the at least one second image is taken as an image of a hand region of the target object in this frame of image.

In a possible implementation, three-dimensional attitude angles of target joint points of a target object in each frame of image of a target video may be obtained by invoking a three-dimensional attitude estimation model.

In some embodiments, after obtaining the three-dimensional attitude angles of the target joint points of the target object in this frame of image, the three-dimensional attitude angles of the target joint points in this frame of image may be inputted into a SMPL model to obtain a human body model of the target object, such as the human body model of the target object shown in FIG. 3a.

The three-dimensional attitude estimation model may be obtained by training a neural network model based on a training data set containing a large number of training samples. The specific network structure of the three-dimensional attitude estimation model is not limited in this embodiment, and may be configured according to certain requirements. In some embodiments, the three-dimensional attitude estimation model may be a model based on a convolutional neural network. For example, the three-dimensional attitude estimation model may be a neural network model including, but not limited to, a model structure based on ResNet, InceptionNet, DenseNet, VggNet, SENet, etc. The input of the model is one frame of image or image data obtained after vectorization processing of this frame of image, and the output of the model is three-dimensional attitude angles or three-dimensional coordinates of the joint points in this frame of image.

In an optional embodiment of this application, the three-dimensional attitude estimation model may be trained using a Frankmocap algorithm based on multiple three-dimensional attitude data sets, such as Human 3.6M, using a ResNet-based neural network. The three-dimensional attitude data set Human 3.6M is a maximum data set for 3D human body attitude estimation, which is composed of 3.6 million attitudes and corresponding video frames. The video frames contain the process that 11 actors perform 15 daily activities from 4 camera perspectives.

As shown in FIG. 5, in an example where the input of the three-dimensional attitude estimation model is an image of a current frame in a target video, after inputting the first image and the at least one second image determined above to the three-dimensional attitude estimation model, a torso three-dimensional attitude estimation 504 may be performed by the first image and a torso three-dimensional attitude estimation model to determine a three-dimensional attitude angle of a target joint point on the torso of the target object in this frame of image. A hand three-dimensional attitude estimation 505 is performed by the at least one second image and a hand three-dimensional attitude estimation model to determine three-dimensional attitude angles of target joint points on the hands of the target object in this frame of image.

After obtaining the three-dimensional attitude angle of the target joint point on the torso of the target object in this frame of image and the three-dimensional attitude angles of the target joint points on the hands of the target object in this frame of image, the three-dimensional attitude angles on the wrist joint points (namely, the left hand wrist joint point and the right hand wrist joint point) of both hands determined by the torso three-dimensional attitude estimation model may be integrated with the three-dimensional attitude angle of the target joint point on the torso of the target object in this frame of image by a component integration model 506, and the three-dimensional attitude angles of the wrist joint points of both hands determined by the hand three-dimensional attitude estimation model may be integrated with the three-dimensional attitude angles of the target joint points on both hands in this frame of image, to obtain a whole-body three-dimensional attitude 507, namely, the three-dimensional attitude angles of the target joint points of the target object in this frame of image. The integration processing includes connection, smoothing, and the like between the three-dimensional attitude angles.

Since some regions of the target object may be blocked in the target video of a single perspective, namely, the three-dimensional attitude angles or three-dimensional coordinates of some target joint points (namely, missing joint points) cannot be accurately obtained, the accuracy of the determined attitude of the virtual object is reduced. Therefore, the correction of the initial three-dimensional attitude angles of the target joint points determined by the target video may be accomplished by determining the three-dimensional attitude angles or three-dimensional coordinates of the missing joint points according to a non-target video associated with the target video.

In a possible implementation, at least two videos acquired by an image acquisition device with at least two acquisition perspectives may be obtained. At least two acquisition perspectives include a first perspective and at least one second perspective, and the target video is a video corresponding to the first perspective.

The image acquisition devices may be provided to perform image acquisition on the target object at the same time, and the image acquisition devices may also be provided to perform image acquisition on the target object in different time periods. The present disclosure is not limited thereto.

Figure 6:
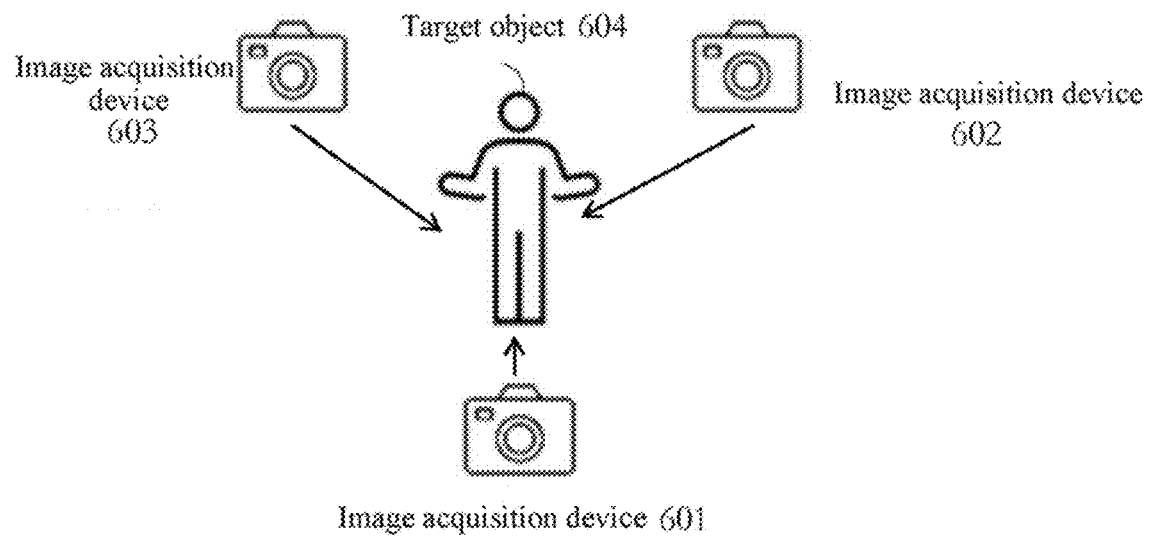
FIG. 6 shows a schematic diagram of an image acquisition apparatus according to an embodiment of this application.

FIG. 6 shows a schematic diagram of an image acquisition apparatus according to an embodiment of this application. As shown in FIG. 6, image acquisition of a target object 604 may be performed simultaneously by three image acquisition devices 601, 602, and 603 of the same model. Each of the image acquisition devices 601, 602, and 603 have an acquisition perspective of 120°. Each of the image acquisition devices 601, 602, and 603 surrounds the target object. Each of the image acquisition devices 601, 602, and 603 are equally spaced apart from the target object 604. Each of the image acquisition devices 601, 602, and 603 is equally spaced apart from the ground, whereby the target object 604 remains within the acquisition perspectives of all the image acquisition devices 601, 602, and 603.

Specifically, in this embodiments, step S121 of determining three-dimensional attitude angles of target joint points of the target object in each frame of image based on this frame of image, and first three-dimensional coordinates of a first joint point and a second joint point corresponding to this frame of image in a first coordinate system may be implemented by the following operations.

Initial joint points of the target object in this frame of image are detected based on this frame of image. The target joint points include the initial joint points.

Initial three-dimensional attitude angles of the target joint points in this frame of image are determined based on this frame of image.

It is determined that there is no missing joint point in response to the number of the initial joint points being equal to a total number of the target joint points, and the initial three-dimensional attitude angles of the target joint points in this frame of image are determined as the three-dimensional attitude angles of the target joint points in this frame of image. The missing joint point is a joint point other than the initial joint points in the target joint points.

It is determined that there is a missing joint point in response to the number of the initial joint points being less than the total number of the target joint points, and a three-dimensional attitude angle of the missing joint point is determined according to an associated image corresponding to this frame of image in a non-target video. The non-target video is at least one video in the at least two videos except the target video. The determined three-dimensional attitude angle of the missing joint point and the initial three-dimensional attitude angles of the initial joint points are determined as the three-dimensional attitude angles of the target joint points in this frame of image.

The initial joint points are target joint points which may be determined according to each frame of image of the target video. The number of the initial joint points may be determined after determining the initial joint points in each frame of image of the target video by invoking the foregoing two-dimensional joint point detection model.

The missing joint point is a joint point other than the initial joint points in the target joint points. Whether there is a missing joint point may be determined according to a relationship between the number of the initial joint points and the total number of the target joint points. In response to that the number of the initial joint points is less than the total number of the target joint points, it is determined that there is a missing joint point. In response to that the number of the initial joint points is equal to the total number of the target joint points, it is determined that there is no missing joint point.

In some embodiments, the associated image may be an image with the same timestamp as that corresponding to this frame of image in the non-target video. When it is determined that there is a missing joint point, initial three-dimensional attitude angles of the target joint points in this frame of image and three-dimensional attitude angles of the target joint points in the associated image may be respectively determined by invoking the foregoing three-dimensional attitude estimation model. And three-dimensional attitude angles of the initial joint points are determined according to the initial three-dimensional attitude angles of the target joint points in this frame of image. A three-dimensional attitude angle of the missing joint point is determined according to the three-dimensional attitude angles of the target joint points in the associated image. Therefore, the three-dimensional attitude angles of the initial joint points and the three-dimensional attitude angle of the missing joint point are determined as the three-dimensional attitude angles of the target joint points in this frame of image.

Figure 7A:
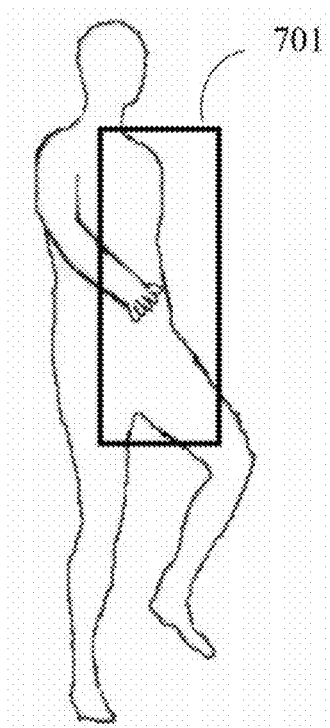
FIG. 7a shows a schematic diagram of determining three-dimensional attitude angles of target joint points in this frame of image according to an embodiment of this application.
Figure 7B:
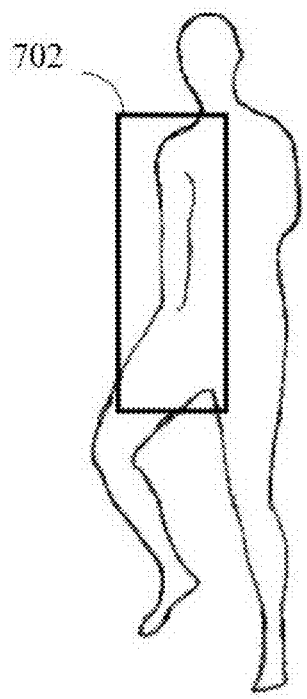
FIG. 7b shows a schematic diagram of a simulated region of a missing joint point according to an embodiment of this application.
Figure 7C:
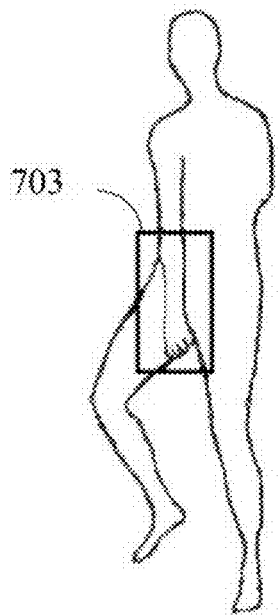
FIG. 7c shows a schematic diagram of a three-dimensional attitude angle after attitude correction according to an embodiment of this application.

FIG. 7a shows a schematic diagram of determining three-dimensional attitude angles of target joint points in this frame of image according to an embodiment of this application. FIG. 7b shows a schematic diagram of a simulated region of a missing joint point according to an embodiment of this application. FIG. 7c shows a schematic diagram of a three-dimensional attitude angle after attitude correction according to an embodiment of this application.

As shown in FIG. 7a, since the left arm of a target object is blocked by other parts of the body in one frame of image of a target video, as shown by a solid line box 701, a target joint point in a left arm region of the target object cannot be detected when performing two-dimensional joint point detection through this frame of image. Obviously, even if initial three-dimensional attitude angles of all the target joint points may be obtained through prediction according to the three-dimensional attitude estimation model, and a human body model of the target object is restored through the SMPL-X model, a three-dimensional attitude angle of the target joint point in the left arm region of the target object cannot be accurately determined.

To clearly show the missing joint point, this application performs simulation according to FIG. 7a, to obtain an image shown in FIG. 7b. As shown in FIG. 7b, it may be seen that the blocked left arm region of the target object cannot be completely determined according to this frame of image. That is, the target joint point of the left arm region of the target object cannot be detected according to this frame of image. As shown by a solid line box 702, the wrist and the hand are missing.

By performing two-dimensional joint point detection on the associated image, the three-dimensional attitude angle of the missing joint point may be accurately determined. As shown by a solid line box 703, three-dimensional attitude angles of the wrist and the hand may also be accurately obtained, to obtain the three-dimensional attitude angles of the target joint points of the target object, and the human body model of the target object is restored through the SMPL-X model, namely, FIG. 7c.

The video of the target object is acquired according to the image acquisition devices of different perspectives, thereby replacing the initial three-dimensional attitude angle of the missing joint point in the initial three-dimensional attitude angle of the target joint point determined according to the target video with the three-dimensional attitude angle of the missing joint point determined according to the non-target video, the correction of the initial three-dimensional attitude angles of the target joint points determined by the target video may be completed, and the attitude of the virtual object is controlled more accurately. And the data processing method according to this application may be implemented by at least two image acquisition devices without relying on a wearable sensor. The operation is simple, and the cost is low.

In some embodiments, the determining a second three-dimensional coordinates of the first joint point corresponding to the current frame of image in a second coordinate system includes:
determining the second three-dimensional coordinates of the first joint point according to the three-dimensional attitude angle of the first joint point in this frame of image.

Or,

In some embodiments, the determining a second three-dimensional coordinates of the first joint point corresponding to the current frame of image in a second coordinate system includes:
determining a two-dimensional coordinate of the first joint point in the second coordinate system according to an image position of the first joint point in this frame of image;
estimating a coordinate of the first joint point in a depth direction according to this frame of image and a related image of this frame of image; and
determining the second three-dimensional coordinates of the first joint point based on the two-dimensional coordinate and the coordinate in the depth direction, the target video being a video acquired by a monocular image acquisition device, and the related image being a previous frame of image relative to this frame of image; or, the target video being one of two videos acquired by the monocular image acquisition device, and the related image being an image corresponding to this frame of image in the other video.

The second three-dimensional coordinates of the first joint point may be determined by inputting the three-dimensional attitude angle of the first joint point in this frame of image into the above SMPL-X model. The SMPL-X model may output, according to the inputted three-dimensional attitude angles of the target joint points, a human body model performing motions corresponding to the three-dimensional attitude angles of the target joint points and the second three-dimensional coordinates of the target joint points.

In order to determine the second three-dimensional coordinates of the first joint point more accurately, the two-dimensional coordinate of the first joint point in the second coordinate system may be determined according to an image position of the first joint point in this frame of image, and a coordinate of the first joint point in a depth direction may be obtained by estimating depth information of the first joint point of the target object in this frame of image, whereby the second three-dimensional coordinates of the first joint point in this frame of image is obtained based on the foregoing two-dimensional coordinate and the coordinate in the depth direction.

In some embodiments, in response to that the above image acquisition device is a monocular image acquisition device, according to an image corresponding to a current moment (namely, a current frame of image) and an image corresponding to a previous moment relative to the current moment (a previous frame of image relative to the current frame of image) acquired by the image acquisition device, depth information of the target object in the current frame of image may be estimated based on a monocular depth estimation algorithm. The monocular depth estimation algorithm may be a codec-based monocular depth estimation algorithm, namely, may be implemented by using a trained neural network model. In response to that the above image acquisition device is a binocular image acquisition device, according to two images acquired by the image acquisition device at a current moment, depth information of the target object in the current frame of images may be determined based on a binocular depth estimation algorithm.

As shown in FIG. 2, assuming that the above image acquisition device is a monocular image acquisition device, a second three-dimensional coordinates $path_{pri}(x,y,z)$ of the first joint point may be determined according to a two-dimensional coordinate (x, y) of the first joint point A and the estimated depth information z of the target object.

In a possible implementation, the coordinate conversion relationship may be obtained by the following steps:
  determining a first distance between two associated joint points according to second three-dimensional coordinates of the two associated joint points, the two associated joint points being two specified joint points with a parent-child relationship in the target joint points;
  obtaining a reference distance between the two specified joint points in the first coordinate system; and
  determining the coordinate conversion relationship according to the first distance and the reference distance.

In some embodiments, any two target joint points that have a parent-child relationship among the target joint points may be taken as the above two associated joint points. In order to reduce the data amount of data processing and improve the efficiency of data processing, the two associated joint points may be two joint points having a direct parent-child relationship. For example, the two associated joint points may be a knee joint point and an ankle joint point.

In some embodiments, second three-dimensional coordinates of the two associated joint points may be determined according to the above manner of determining the second three-dimensional coordinates of the first joint point, whereby a first distance $h_1$ is determined according to the second three-dimensional coordinates of each associated joint point.

In some embodiments, the virtual object may be constructed by any programmable image construction model. For example, the virtual object may be constructed by a virtual engine. After the virtual object is constructed, a root node of the virtual object may be coincident with an origin of the first coordinate system, and a reference distance $h_0$ of the two associated joint points in the second coordinate system may be determined, whereby a coordinate conversion relationship $h_1/h_0$ may be determined.

Based on the above, the first three-dimensional coordinates of the first joint point may be determined according to the following formula (1):

$$path_{norm}(x, y, z) = \frac{path_{pri}(x, y, z)}{h_1/h_0} \qquad \text{Formula (1)}$$

where $path_{norm}(x,y,z)$ represents the first three-dimensional coordinates of the first joint point, $path_{pri}(x,y,z)$ represents the second three-dimensional coordinates of the first joint point, and $h_1/h_0$ represents the coordinate conversion relationship.

In the process of obtaining a target video, the final generated target video has obvious noise due to an imaging error of an optical camera, etc. When the attitude of the virtual object is determined according to the noisy target video, it may cause the virtual object to have unnatural or abnormal limb motions, resulting in shaking and abnormal rotation of the target joint points of the virtual object.

In view of this, the method may also filter an attitude angle sequence of each target joint point in each dimension according to the following specific steps:
  obtaining a frame rate of the target video; and
  determining a filtered sliding window width of a two-dimensional attitude angle of a joint point according to the frame rate of the target video.

In this embodiments, the determining a filtered sliding window width of an attitude angle of a joint point according to the frame rate of the target video includes:
  determining an adjustment coefficient of a sliding window width according to the frame rate;
  determining an initial sliding window width based on a product of the frame rate and the adjustment coefficient; and
  determining a larger value of the initial sliding window width and a preset sliding window width as the filtered sliding window width.

The adjustment coefficient of the sliding window width is a non-linear coefficient, and the preset sliding window width refers to a minimum sliding window width.

For example, the sliding window width may be calculated by the following formula (2):

$$win_{width} = \max\left(n, FPS \times e^{0.2 \times \left(1 - \frac{FPS}{n}\right)}\right) \qquad \text{Formula (2)}$$

where $win_{width}$ represents the filtered sliding window width of the target video, FPS represents the frame rate of the target video, $$e^{0.2 \times \left(1 - \frac{FPS}{n}\right)}$$

represents the non-linear coefficient, and n represents the preset minimum sliding window width, which may be configured according to certain requirements (for example, an empirical value or an experimental value). This application is not limited thereto. For example, n may be set to 30.

An attitude angle sequence of each target joint point in each dimension is filtered according to the filtered sliding window width to obtain a filtered attitude angle sequence. The attitude angle sequence of a target joint point in one dimension includes a two-dimensional attitude angle of the target joint point in each frame of image of the target video in the dimension.

Figure 8:
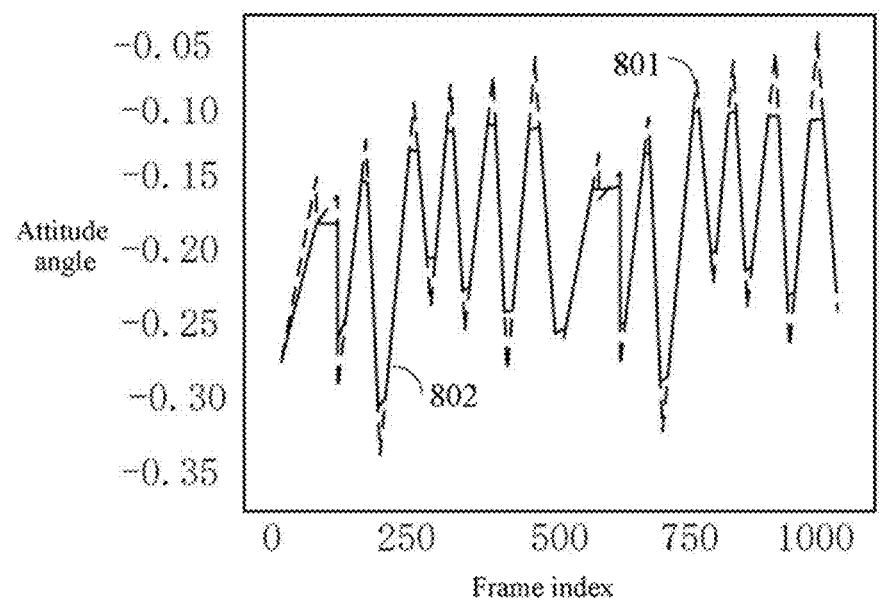
FIG. 8 shows a schematic comparison diagram of an attitude angle sequence of one dimension of a target joint point before and after filtering processing according to an embodiment of this application.

FIG. 8 shows a schematic comparison diagram of an attitude angle sequence of one dimension of a target joint point before and after filtering processing according to an embodiment of this application. As shown in FIG. 8, the horizontal axis represents a frame index (frame_idx), namely, a total number of frames of image in the video. The vertical axis represents a two-dimensional attitude angle (θ) in degrees. A dotted line portion 801 represents a curve of the attitude angle sequence of one dimension of the target joint point before filtering processing, and a solid line portion 802 represents a curve of the attitude angle sequence of one dimension of the target joint point after filtering processing. As shown by the dotted line portion 801 in FIG. 8, due to the presence of the noise, burrs repeatedly appear on a smooth curve formed by the attitude angle sequence of each dimension of each target joint point. The curve 802 formed by the filtered attitude angle sequence has almost no burr compared with the curve 802 formed by the filtered attitude angle sequence, and the burrs can be effectively removed.

In this embodiments, the determining the three-dimensional attitude of the virtual object corresponding to this frame of image according to the target three-dimensional coordinates of the first joint point and the three-dimensional attitude angles of the target joint points in this frame of image may include:

obtaining a filtered three-dimensional attitude angle of each target joint point in this frame of image according to the filtered attitude angle sequence in each dimension; and determining the three-dimensional attitude of the virtual object corresponding to this frame of image according to the target three-dimensional coordinates of the first joint point and the filtered three-dimensional attitude angles of the target joint points in this frame of image.

Figure 9A:
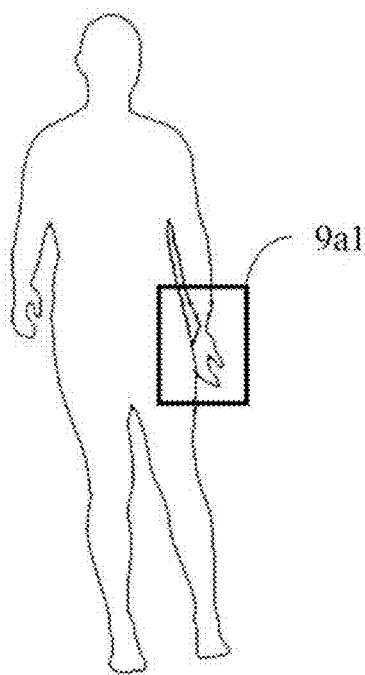
FIG. 9a shows a schematic diagram of a three-dimensional attitude angle of a target object in one frame of image before filtering processing according to an embodiment of this application.
Figure 9B:
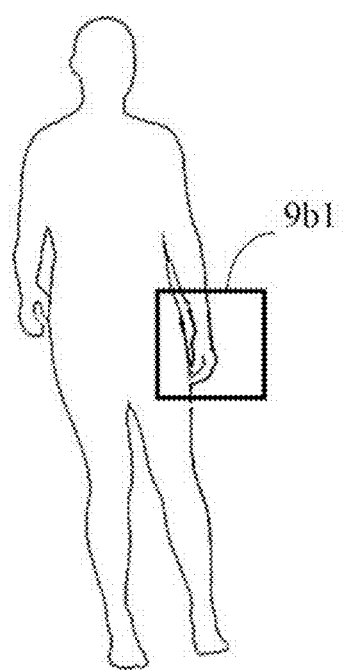
FIG. 9b shows a schematic diagram of a three-dimensional attitude angle of a target object in one frame of image after filtering processing according to an embodiment of this application.

FIG. 9a shows a schematic diagram of a three-dimensional attitude angle of a target object in one frame of image before filtering processing according to an embodiment of this application. FIG. 9b shows a schematic diagram of a three-dimensional attitude angle of a target object in one frame of image after filtering processing according to an embodiment of this application.

As shown in block 9a1 of FIG. 9a, it may be seen that the right wrist presents an abnormal rotation attitude. That is, the left wrist is reversed.

After filtering the attitude angle sequence of each target joint point in each dimension, contents shown in block 9b1 in FIG. 9b are obtained. It may be seen that the right wrist restores the normal rotation, and this attitude of the wrist is ergonomic.

By filtering the attitude angle sequence of each target joint point in each dimension, the three-dimensional attitude angles of the target joint points may be corrected, the original rotation amplitude of each joint point can be retained while removing the burrs and the noise, and then the attitude of the virtual object may be controlled according to the target joint points.

When the performance of a camera is limited, the frame rate of the obtained video will be relatively low. At this moment, the three-dimensional attitude sequence obtained will show obvious jams, and when a joint rotation angle is smoothed, a high-frequency rotation amount will be smoothed incorrectly as noise, thereby reducing the attitude accuracy.

In view of this, in a possible implementation, the data processing method may further include:

determining optical flow information of the target object between adjacent frames in the target video;

performing frame supplementation processing between the adjacent frames according to the optical flow information to obtain at least one frame supplementation image between the adjacent frames; and obtaining a frame-supplemented target video based on the target video and the frame supplementation image between the adjacent frames.

In this embodiments, the performing step S121 to step S124 on each frame of image of a target video may include: performing step S121 (determining three-dimensional attitude angles of target joint points of the target object in each frame of image based on this frame of image, and first three-dimensional coordinates of a first joint point and a second joint point corresponding to this frame of image in a first coordinate system) to step S124 (determining the three-dimensional attitude of the virtual object corresponding to this frame of image according to the target three-dimensional coordinates of the first joint point and the three-dimensional attitude angles of the target joint points in this frame of image) on each frame of image in the frame-supplemented target video.

In some embodiments, the optical flow information of the target object may include an optical flow trajectory and an optical flow direction of the target object. An optical flow trajectory and direction of the target object between two adjacent frames of image in the target video may be calculated based on an optical flow video frame supplementation algorithm, to predict an intermediate optical flow trajectory and direction of the target object between the two frames of image, thereby obtaining an intermediate frame between the two frames of image, and then obtaining the frame-supplemented target video. That is, without changing the original duration of the target video, the total number of frames of the target video is effectively increased, to improve the frame rate of the target video, improve the coherence of the attitude of the target object between two adjacent frames of image, and effectively solve the problems of obvious jamming of the attitude angle sequence of each target joint point in each dimension, and mis-smoothing of the three-dimensional attitude angles of the target joint points due to the high-frequency rotation of the target joint points of the target object.

In some embodiments, when it is determined that there is a missing joint point, it is also necessary to perform the frame supplementation operation on the non-target video to obtain a frame-supplemented non-target video, to determine a three-dimensional attitude angle of the missing joint point according to an associated image corresponding to this frame of image in the frame-supplemented non-target video.

The coherence between adjacent frames of image of the virtual object can be improved by performing frame supplementation on the target video, determining, based on each frame of image of the frame-supplemented target video, the target three-dimensional coordinates of the first joint point and the three-dimensional attitude angles of the target joint points in this frame of image, and further determining the three-dimensional attitude of the virtual object corresponding to this frame of image.

Figure 10:
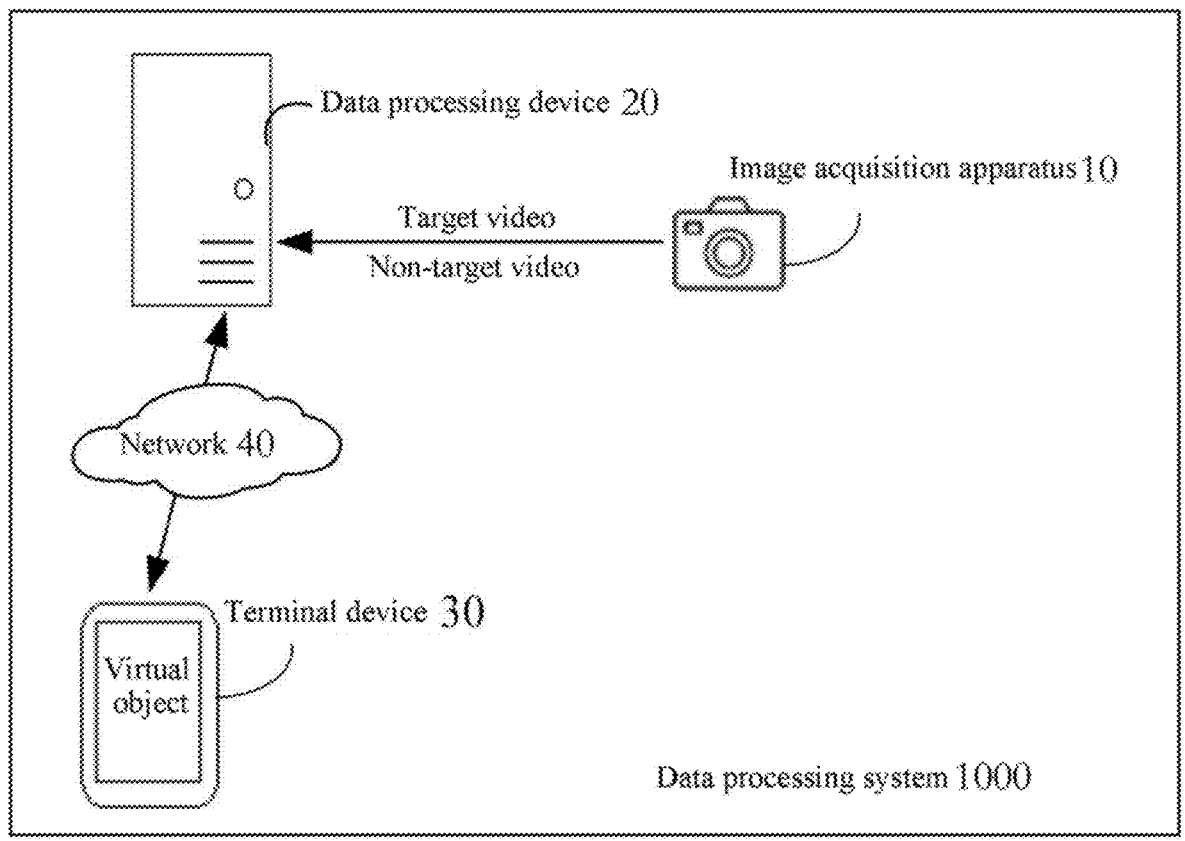
FIG. 10 shows a schematic structural diagram of a data processing system to which this application is applicable.

In order to better explain the applicability of the solution of this embodiment, the solution of this embodiment is described below in connection with a specific application scenario of the data processing method. The application scenario is a production process of various games, fantasy movies/TV series, etc. In this scenario, when an actor (namely, the above target object) performs, three cameras may be used for photographing motion videos of the actor, and a virtual character in the game is driven to move according to the motions of the actor. FIG. 10 shows a schematic structural diagram of a data processing system 1000 to which this application is applicable. As shown in FIG. 10, system 1000 may include an image acquisition apparatus 10, a data processing device 20, a terminal device 30, and a network 40.

The image acquisition apparatus 10 is a set of any electronic devices that may perform image acquisition. With reference to the image acquisition mode shown in FIG. 6, image acquisition apparatus 10 includes three image acquisition devices 601, 602, and 603 corresponding to different acquisition perspectives. The three image acquisition devices 601, 602, and 603 surround a target object 604, and are uniformly placed around the target object 604. The three image acquisition devices include a first device corresponding to a first perspective and two second devices corresponding to a second perspective. The target video is a video acquired by the first device, and a video acquired by the second device is referred to as a non-target video. Then, the image acquisition apparatus 10 transmits the acquired target video and non-target video to the data processing device 20.

The data processing device 20 obtains, according to the method described in the embodiments of this application, a three-dimensional attitude of a virtual object, associated with the target object, corresponding to each frame of image based on each frame of image of the target video. The data processing device 20 determines a three-dimensional attitude angle of target joint points of the target object in each frame of image of the target video by performing the following operations:

- detecting initial joint points of the target object in this frame of image of the target video based on this frame of image, the target joint points including the initial joint points;
- determining initial three-dimensional attitude angles of the target joint points in this frame of image of the target video based on this frame of image;
- determining that there is no missing joint point in response to the number of the initial joint points being equal to a total number of the target joint points, and determining the initial three-dimensional attitude angles of the target joint points in this frame of image as the three-dimensional attitude angles of the target joint points in this frame of image;
- determining that there is a missing joint point in response to the number of the initial joint points being less than the total number of the target joint points, and determining a three-dimensional attitude angle of the missing joint point according to an associated image corresponding to this frame of image in a non-target video, the non-target video being at least one video in the at least two videos except the target video; and determining the determined three-dimensional attitude angle of the missing joint point and the initial three-dimensional attitude angles of the initial joint points as the three-dimensional attitude angles of the target joint points in this frame of image.

Then, the data processing device 20 transmits the obtained three-dimensional attitude of the virtual object corresponding to each frame of image to the terminal device 30.

An application capable of performing virtual reality (VR) conversion is installed in the terminal device 30 to drive the virtual object to perform a corresponding motion based on the obtained three-dimensional attitude of the virtual object in each frame of image. A user may issue control instructions to the virtual object through the application.

The terminal device 30 is connected to the data processing device 20 via network 40. Data processing device 20 may be a server or a server cluster in which a database is configured. The three-dimensional attitude angles and three-dimensional coordinates of a large number of target joint points are stored in the database.

Figure 11:
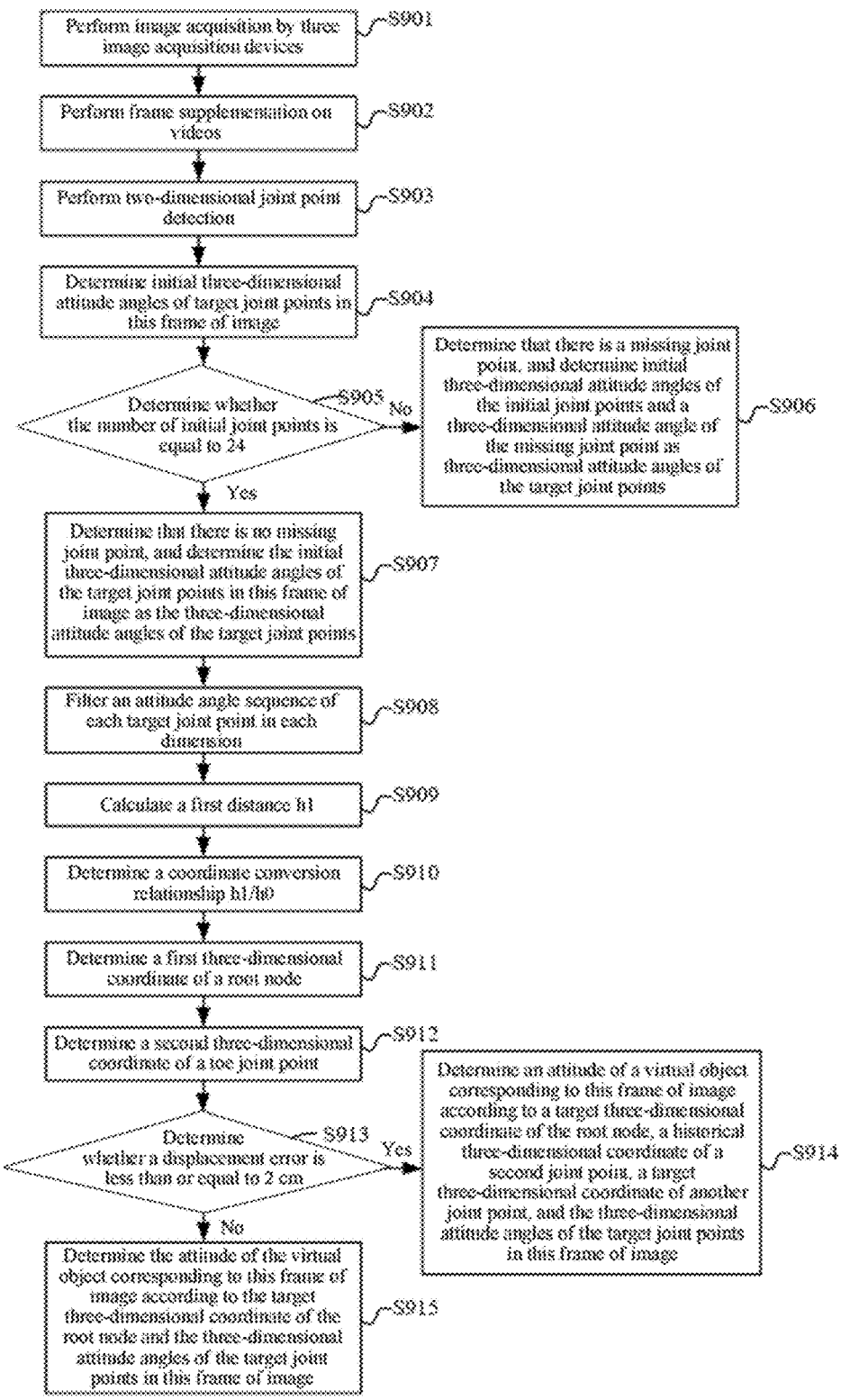
FIG. 11 shows a flowchart of a data processing method according to a scenario embodiment of this application.

Optional embodiments of the solution of this application are described below in connection with the system. FIG. 11 shows a flowchart of a data processing method according to a scenario embodiment of this application. The method is performed by an electronic device, for example, the data processing device 20 in FIG. 10. As shown in FIG. 11, the method may include step S901 to step S915.

Step S901: Perform image acquisition on an actor by three image acquisition devices with the same model at the same time, and obtain a video acquired by each image acquisition device. At least two perspectives include a first perspective and at least one second perspective. The first perspective is determined as a primary perspective, and the second perspective is determined as a secondary perspective. The video corresponding to the first perspective is determined as a target video, and the video corresponding to the second perspective is determined as a non-target video.

Step S902: Perform frame supplementation on the videos to obtain a frame-supplemented target video and a frame-supplemented non-target video.

The following step S903 to step S915 are performed on each frame of image of the frame-supplemented target video.

Step S903: Input this frame of image into a two-dimensional joint point detection model, and perform two-dimensional joint point detection to obtain initial joint points in this frame of image. It is assumed that the total number of target joint points is 24.

Step S904: Input this frame of image into a three-dimensional attitude estimation model, and determine initial three-dimensional attitude angles of the target joint points in this frame of image.

Step S905: Determine whether the number of initial joint points is equal to 24.

Step S906: Determine that there is a missing joint point if the number of initial joint points is not equal to 24, namely, less than 24, input an associated image in the frame-supplemented non-target video which has the same timestamp as that of this frame of image into the three-dimensional attitude estimation model to determine three-dimensional attitude angles of the target joint points in the associated image, determine a three-dimensional attitude angle of the missing joint point according to the three-dimensional attitude angles of the target joint points in the associated image, and then determine the initial three-dimensional attitude angles of the initial joint points and the three-dimensional attitude angle of the missing joint point as the three-dimensional attitude angles of the target joint points.

Step S907: Determine that there is no missing joint point if the number of the initial joint points is equal to 24, and determine the initial three-dimensional attitude angles of the target joint points in this frame of image as the three-dimensional attitude angles of the target joint points.

Step S908: Filter an attitude angle sequence of each target joint point in each dimension according to Formula (2) to obtain a filtered attitude angle sequence.

Step S909: Determine a knee joint point and an ankle joint point as two associated joint points, input a three-dimensional attitude angle of the knee joint point and a three-dimensional attitude angle of the ankle joint point into a SMPL-X model, determine a second three-dimensional coordinates of the knee joint point in a second coordinate system corresponding to this frame of image and a second three-dimensional coordinates of the ankle joint point in the second coordinate system, and calculate a first distance h1 between the second three-dimensional coordinates of the knee joint point and the second three-dimensional coordinates of the ankle joint point.

Step S910: Construct a virtual object by the virtual engine, coincide a lumbar joint point of the virtual object with an origin of a first coordinate system where the virtual object is located, and determine a distance h0 between the knee joint point and the ankle joint point in the virtual object, namely, the foregoing reference distance, to determine a coordinate conversion relationship $h_1/h_0$.

Step S911: Calculate a second two-dimensional coordinate (x, y) of a root node in a second coordinate system, calculate a distance z between the image acquisition device for acquiring the target video and the real actor according to a monocular depth estimation algorithm, to determine a second two-dimensional coordinate $path_{pri}(x,y,z)$ of the root node, and determine a first three-dimensional coordinates $path_{norm}(x,y,z)$ of the root node according to Formula (1). The root node is taken as the foregoing first joint point.

Step S912: Input the first three-dimensional coordinates of the root node and the filtered three-dimensional attitude angles of the target joint points into the virtual engine, and determine a first three-dimensional coordinates of a toe joint point corresponding to this frame of image. The toe joint point is taken as the foregoing second joint point.

The first three-dimensional coordinates of each joint point corresponding to each frame of image may be stored in the virtual engine. The specific storage mode is not limited in this application.

Step S913: Determine, according to the first three-dimensional coordinates of the toe joint point corresponding to this frame of image and a historical three-dimensional coordinate, a Euclidean distance (namely, the foregoing displacement deviation) therebetween and a difference therebetween in each dimension, and determine whether the distance therebetween is less than or equal to a set value, for example, 2 cm. The historical three-dimensional coordinates is a first three-dimensional coordinates of the toe joint point corresponding to a previous frame of image relative to this frame of image.

Step S914: Add, if the distance therebetween is less than or equal to the set value, the difference corresponding to each dimension to the coordinate of each dimension in the first three-dimensional coordinates of the root node to obtain a target three-dimensional coordinates of the root node, determine the target three-dimensional coordinates of the root node as the three-dimensional coordinates of the root node of the virtual object, and re-drive the virtual engine, whereby the virtual engine determines a target three-dimensional coordinates of another joint point according to the three-dimensional attitude angle of the another joint point, and then determines a three-dimensional attitude of the virtual object according to the target three-dimensional coordinates of the root node, the historical three-dimensional coordinates of the second joint point, the target three-dimensional coordinates of the another joint point, and the three-dimensional attitude angles of the target joint points in this frame of image. Another joint point is a joint point other than the root node and the toe joint point in the target joint points.

Step S915: Directly determine, if the distance therebetween is greater than the set value, the first three-dimensional coordinates of the root node as the target three-dimensional coordinates of the root node of the virtual object, and re-drive the virtual engine, whereby the virtual engine determines a target three-dimensional coordinates of another joint point according to the first three-dimensional coordinates of the root node and three-dimensional attitude angle of the another joint point, and then determines a three-dimensional attitude of the virtual object corresponding to this frame of image according to the target three-dimensional coordinates of the target joint points and the three-dimensional attitude angles of the target joint points in this frame of image.

Figure 12:
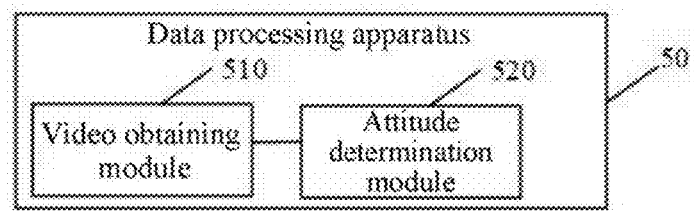
FIG. 12 is a schematic structural diagram of a data processing apparatus according to an embodiment of this application.

Embodiments of this application also provide a data processing apparatus based on the same principle as the data processing method according to the embodiments of this application. FIG. 12 is a schematic structural diagram of a data processing apparatus according to an embodiment of this application. As shown in FIG. 12, the data processing apparatus 50 includes a video obtaining module 510 and an attitude determination module 520.

The video obtaining module 510 is configured to obtain a target video of a target object. The target video includes at least one frame of image.

The attitude determination module 520 is configured to:
perform the following processing on each frame of image to obtain a three-dimensional attitude of a virtual object, associated with the target object, corresponding to each frame of image:

determining three-dimensional attitude angles of target joint points of the target object in this frame of image, and first three-dimensional coordinates of a first joint point and a second joint point corresponding to this frame of image in a first coordinate system, the first joint point and the second joint point being specified joint points in the target joint points, the first coordinate system being a coordinate system corresponding to the virtual object, and the first joint point being a root node in the target joint points;

determining a displacement deviation of the second joint point according to the first three-dimensional coordinates of the second joint point corresponding to this frame of image and a historical three-dimensional coordinates thereof corresponding to a previous frame of image relative to this frame of image;

correcting, in response to the displacement deviation being less than or equal to a set value, the first three-dimensional coordinates of the first joint point according to the first three-dimensional coordinates and the historical three-dimensional coordinates of the second joint point, to obtain a target three-dimensional coordinates of the first joint point; and determining the three-dimensional attitude of the virtual object corresponding to this frame of image according to the target three-dimensional coordinates of the first joint point and the three-dimensional attitude angles of the target joint points in this frame of image.

In some embodiments, the attitude determination module 520 is further configured to: take the first three-dimensional coordinates of the first joint point as the target three-dimensional coordinates in response to that the displacement deviation is greater than the set value.

In some embodiments, the attitude determination module 520, when determining the three-dimensional attitude of the virtual object corresponding to this frame of image, may be configured to:

determine a target three-dimensional coordinates of another joint point in this frame of image in the first coordinate system according to the target three-dimensional coordinates of the first joint point and the three-dimensional attitude angle of the another joint point, the another joint point being a joint point except the first joint point and the second joint point in the target joint points; and determine the three-dimensional attitude of the virtual object corresponding to this frame of image according to the target three-dimensional coordinates of the target joint points and the three-dimensional attitude angles of the target joint points in this frame of image.

In some embodiments, the attitude determination module 520, when correcting the first three-dimensional coordinates of the first joint point, may be configured to:

determine a difference between the first three-dimensional coordinates and the historical three-dimensional coordinates of the second joint point in each dimension of the first coordinate system; and correct, based on the difference corresponding to each dimension, a coordinate of the corresponding dimension in the first three-dimensional coordinates of the first joint point, to obtain a target three-dimensional coordinates of the first joint point.

In some embodiments, the apparatus 50 further includes a filtering module for performing the following operations:

obtaining a frame rate of the target video;

determining a filtered sliding window width of a two-dimensional attitude angle of a joint point according to the frame rate of the target video; and filtering an attitude angle sequence of each target joint point in each dimension according to the filtered sliding window width to obtain a filtered attitude angle sequence, the attitude angle sequence of a target joint point in one dimension including a two-dimensional attitude angle of the target joint point in each frame of image of the target video in the dimension.

In this embodiments, the attitude determination module 520, when determining the three-dimensional attitude of the virtual object corresponding to this frame of image, may be configured to:

determine the three-dimensional attitude of the virtual object corresponding to this frame of image according to the target three-dimensional coordinates of the first joint point and the filtered three-dimensional attitude angles of the target joint points in this frame of image.

In some embodiments, the filtering module, when determining the filtered sliding window width of the attitude angle of the joint point according to the frame rate of the target video, may be configured to:

determine an adjustment coefficient of a sliding window width according to the frame rate;

determine an initial sliding window width based on a product of the frame rate and the adjustment coefficient; and determine a larger value of the initial sliding window width and a preset sliding window width as the filtered sliding window width.

In some embodiments, the attitude determination module 520, when determining three-dimensional attitude angles of target joint points of the target object in this frame of image, and first three-dimensional coordinates of a first joint point and a second joint point corresponding to this frame of image in a first coordinate system, may be configured to:

determine the three-dimensional attitude angles of the target joint points in this frame of image through a three-dimensional attitude estimation model based on this frame of image;

determine a second three-dimensional coordinates of the first joint point corresponding to this frame of image in a second coordinate system, the second coordinate system being an image coordinate system corresponding to the target video;

determine the first three-dimensional coordinates of the first joint point according to the second three-dimensional coordinates and a coordinate conversion relationship, the coordinate conversion relationship being a conversion relationship between the first coordinate system and the second coordinate system; and determine the first three-dimensional coordinates of the second joint point according to the first three-dimensional coordinates of the first joint point and the three-dimensional attitude angle associated with the second joint point among the three-dimensional attitude angles of the target joint points.

In some embodiments, the attitude determination module 520, when determining the second three-dimensional coordinates of the first joint point in the second coordinate system, may be configured to:

determine the second three-dimensional coordinates of the first joint point according to the three-dimensional attitude angle of the first joint point in this frame of image;

or, determine a two-dimensional coordinate of the first joint point in the second coordinate system according to an image position of the first joint point in this frame of image;

estimate a coordinate of the first joint point in a depth direction according to this frame of image and a related image of this frame of image; and determine the second three-dimensional coordinates of the first joint point based on the two-dimensional coordinate and the coordinate in the depth direction, the target video being a video acquired by a monocular image acquisition device, and the related image being a previous frame of image relative to this frame of image; or, the target video being one of two videos acquired by the monocular image acquisition device, and the related image being an image corresponding to this frame of image in the other video.

In some embodiments, the attitude determination module 520, when determining the coordinate conversion relationship, may be configured to:

determine a first distance between two associated joint points according to second three-dimensional coordinates of the two associated joint points, the two associated joint points being two specified joint points with a parent-child relationship in the target joint points;

obtain a reference distance between the two associated joint points in the first coordinate system; and determine the coordinate conversion relationship according to the first distance and the reference distance.

In some embodiments, the video obtaining module 510 may be configured to:

obtain at least two videos acquired by an image acquisition device with at least two acquisition perspectives, the at least two acquisition perspectives including a first perspective and at least one second perspective, and the target video being a video corresponding to the first perspective.

In this embodiments, the attitude determination module 520, when determining the three-dimensional attitude angles of the target joint points of the target object in this frame of image, may be configured to:

determine initial three-dimensional attitude angles of the target joint points in this frame of image;

determine that there is no missing joint point in response to the number of the initial joint points being equal to a total number of the target joint points, and determine the initial three-dimensional attitude angles of the target joint points in this frame of image as the three-dimensional attitude angles of the target joint points in this frame of image;

determine that there is a missing joint point in response to the number of the initial joint points being less than the total number of the target joint points, and determine a three-dimensional attitude angle of the missing joint point according to an associated image corresponding to this frame of image in a non-target video, the non-target video being at least one video in the at least two videos except the target video; and determine the determined three-dimensional attitude angle of the missing joint point and the initial three-dimensional attitude angles of the initial joint points as the three-dimensional attitude angles of the target joint points in this frame of image.

In some embodiments, the apparatus 50 may further include a video frame supplementation module. The video frame supplementation module is configured to:

determine optical flow information of the target object between adjacent frames in the target video, the optical flow information including an optical flow trajectory and an optical flow direction of the target object;

perform frame supplementation processing between the adjacent frames according to the optical flow information to obtain at least one frame supplementation image between the adjacent frames; and obtain a frame-supplemented target video based on the target video and the frame supplementation images, the attitude determination module 520 being configured to process each frame of image of the frame-supplemented target video to obtain the three-dimensional attitude of the virtual object corresponding to each frame of image. The apparatus according to the embodiments of this application may perform the method according to the embodiments of this application, and the implementation principles thereof are similar. The motions performed by the various modules in the apparatus according to the various embodiments of this application correspond to the steps in the method according to the various embodiments of this application. For a detailed functional description of the various modules of the apparatus, reference may be made in particular to the description of the corresponding method shown in the foregoing description, and detailed descriptions will be omitted herein.

Figure 13:
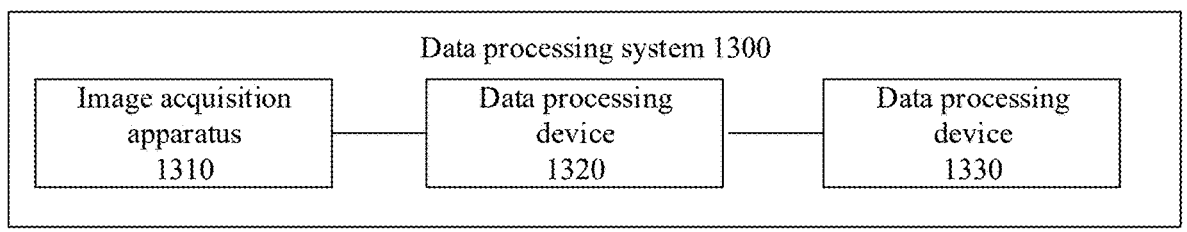
FIG. 13 is a schematic structural diagram of a data processing system according to an embodiment of this application.

FIG. 13 is a schematic structural diagram of a data processing system according to an embodiment of this application. As shown in FIG. 13, the data processing system 1300 includes an image acquisition apparatus 1310, a data processing device 1320, and a terminal device 1330.

The image acquisition apparatus 1310 is configured to obtain a target video of a target object. The target video includes at least one frame of image.

The data processing device 1320 is configured to perform, based on the target video acquired by the image acquisition apparatus, the method in the foregoing embodiments to obtain a three-dimensional attitude of a virtual object, associated with the target object, corresponding to each frame of image of the target video, and transmit the obtained three-dimensional attitude to the terminal device.

The terminal device 1330 is configured to drive the virtual object to perform a corresponding motion based on the obtained three-dimensional attitude. In some embodiments, the image acquisition apparatus 1310 includes three image acquisition devices corresponding to different acquisition perspectives, and the three image acquisition devices surround the target object and are uniformly placed around the target object. The three image acquisition devices include a first device corresponding to a first perspective and two second devices corresponding to a second perspective, and the target video is a video acquired by the first device.

In some embodiments, the image acquisition of the target object may be conducted simultaneously by using three image acquisition devices of the same model and having an acquisition perspective of 120° as described above. Each image acquisition device is arranged around the target object, equally spaced apart from the target object, and also equally spaced apart from the ground, whereby the target object is kept within the acquisition perspectives of the image acquisition devices, thereby achieving that the three image acquisition devices surround the target object and are uniformly placed around the target object.

The data processing device 1320 determines a three-dimensional attitude angle of target joint points of the target object in each frame of image of the target video by performing the following operations:

detecting initial joint points of the target object in this frame of image of the target video based on this frame of image, the target joint points including the initial joint points;

determining initial three-dimensional attitude angles of the target joint points in this frame of image of the target video based on this frame of image;

determining that there is no missing joint point in response to the number of the initial joint points being equal to a total number of the target joint points, and determining the initial three-dimensional attitude angles of the target joint points in this frame of image as the three-dimensional attitude angles of the target joint points in this frame of image;

determining that there is a missing joint point in response to the number of the initial joint points being less than the total number of the target joint points, and determining a three-dimensional attitude angle of the missing joint point according to an associated image corresponding to this frame of image in a non-target video, the non-target video being at least one video in the at least two videos except the target video; and determining the determined three-dimensional attitude angle of the missing joint point and the initial three-dimensional attitude angles of the initial joint points as the three-dimensional attitude angles of the target joint points in this frame of image.

Embodiments of this application also provide an electronic device. The electronic device includes a memory, a processor, and a computer program stored on the memory. The processor executes the computer program to implement the steps of the foregoing data processing method.

Figure 14:
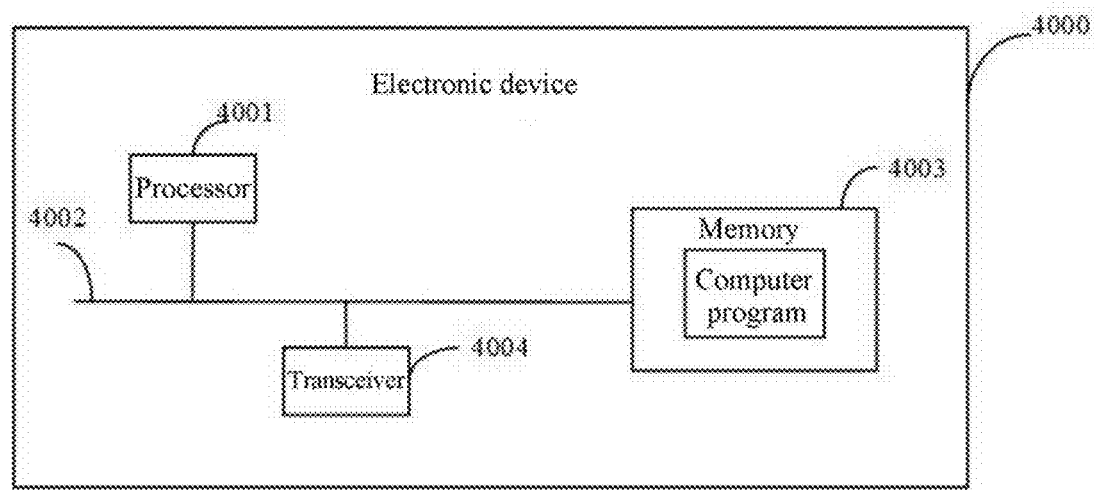
FIG. 14 is a schematic structural diagram of an electronic device according to an embodiment of this application.

FIG. 14 is a schematic structural diagram of an electronic device for data processing according to an embodiment of this application. In an optional embodiment, an electronic device is provided. As shown in FIG. 14, the electronic device 4000 shown in FIG. 14 includes: a processor 4001 and a memory 4003. The processor 4001 is connected to the memory 4003, such as via a bus 4002. In some embodiments, the electronic device 4000 may further include a transceiver 4004. The transceiver 4004 may be configured for data interaction between the electronic device and other electronic devices, such as transmission of data and/or reception of data. It is to be noted that, the number of the transceiver 4004 is not limited to one, and the structure of the electronic device 4000 does not limit this embodiment.

The processor 4001 may be a central processing unit (CPU), a general purpose processor, a digital signal processor (DSP), an application specific integrated circuit (ASIC), a field programmable gate array (FPGA) or another programmable logic device, a transistor logic device, a hardware component, or any combination thereof. Various logical blocks, modules, and circuits described in connection with the disclosure herein may be implemented or performed. The processor 4001 may also be a combination that performs computing functions, for example, including one or more combinations of microprocessors, a combination of the DSP and the microprocessors, and the like.

The bus 4002 may include a path to transfer information between the foregoing components. The bus 4002 may be a peripheral component interconnect (PCI) bus or an extended industry standard architecture (EISA) bus or the like. The bus 4002 may be divided into an address bus, a data bus, a control bus, and the like. For ease of representation, only one thick line is used to represent the bus in FIG. 14, but this does not mean that there is only one bus or only one type of bus.

The memory 4003 may be a read only memory (ROM) or another type of static storage device that may store static information and instructions, a random access memory (RAM) or another type of dynamic storage device that may store information and instructions, or an electrically erasable programmable read only memory (EEPROM), a compact disc read only memory (CD-ROM) or another optical disk storage, optical disc storage (including a compact disc, a laser disc, an optical disc, a digital versatile disc, a blu-ray disc, etc.), a magnetic disk storage medium, other magnetic storage devices, or any other medium that can be configured to carry or store a computer program and that can be read by a computer, which are not limited herein.

The memory 4003 is configured to store the computer program for performing this embodiment and is controlled for execution by the processor 4001. The processor 4001 is configured to execute the computer program stored in memory 4003 to implement the steps shown in the foregoing method embodiments.

Embodiments of this application provide a computer-readable storage medium storing a computer program. The computer program, when executed by a processor, implements the steps of the foregoing data processing method.

Embodiments of this application also provide a computer program product including a computer program. The computer program, when executed by a processor, implements the steps of the foregoing data processing method.

Based on the same principles as the methods according to the embodiments of this application, embodiments of this application also provide a computer program product or computer program. The computer program product or computer program includes computer instructions. The computer instructions are stored in a computer-readable storage medium. A processor of a computer device reads the computer instructions from the computer-readable storage medium. The processor executes the computer instructions, whereby the computer device performs the method according to any of the optional embodiments of this application.

It is to be understood that, although various operational steps are indicated by arrows in the flowcharts of the embodiments of this application, the order in which the steps are performed is not limited to the order indicated by the arrows. In some implementation scenarios of the embodiments of this application, the implementation steps in the flowcharts may be performed in other orders as desired, unless explicitly stated herein. In addition, some or all of the steps in the flowcharts may include multiple sub-steps or multiple stages based on certain implementation scenarios. Some or all of the sub-steps or stages may be performed at the same time, and each of the sub-steps or stages may be performed at different times, respectively. The order of execution of the sub-steps or stages may be flexibly configured according to requirements in different scenarios of execution time, and the embodiments of this application are not limited thereto.

The above description is merely an optional implementation for some implementation scenarios of this application. It is to be noted that adoption of other similar implementation means based on the technical idea of this application by a person of ordinary skill in the art without departing from the technical concept of the solution of this application also falls within the scope of protection of the embodiments of this application.

What is claimed is:

1. A data processing method, performed by an electronic device, the method comprising:
   obtaining a target video of a target object, the target video comprising at least one frame of image;
   determining three-dimensional attitude angles of target joint points of the target object in each frame of image, and first three-dimensional coordinates of a first joint point and a second joint point corresponding to each frame of image in a first coordinate system, the first joint point and the second joint point being among target joint points, the first coordinate system being a coordinate system corresponding to a virtual object, and the first joint point being a root node among the target joint points;
   determining a displacement deviation of the second joint point according to the first three-dimensional coordinates of the second joint point corresponding to each frame of image and a historical three-dimensional coordinates corresponding to a previous frame of image relative to each frame of image;
   correcting the first three-dimensional coordinates of the first joint point according to the first three-dimensional coordinates and the historical three-dimensional coordinates of the second joint point in response to the displacement deviation being less than or equal to a threshold, to obtain a target three-dimensional coordinates of the first joint point;
   determining a filtered sliding window width of a two-dimensional attitude angle of a joint point according to a frame rate of the target video;
   filtering an attitude angle sequence of each target joint point in each dimension according to the filtered sliding window width to obtain a filtered attitude angle sequence, the attitude angle sequence of a target joint point in one dimension comprising a two-dimensional attitude angle of the target joint point in each frame of image of the target video in the dimension;
   obtaining a filtered three-dimensional attitude angle of each target joint point in each frame of image according to the filtered attitude angle sequence in each dimension; and
   determining a three-dimensional attitude of the virtual object corresponding to each frame of image according to the target three-dimensional coordinates of the first joint point and the filtered three-dimensional attitude angles of the target joint points in each frame of image.

2. The method according to claim 1, wherein the determining the three-dimensional attitude of the virtual object corresponding to each frame of image according to the target three-dimensional coordinates of the first joint point and the three-dimensional attitude angles of the target joint points in each frame of image comprises:

for each frame of image, determining a target three-dimensional coordinates of another joint point in each frame of image in the first coordinate system according to the target three-dimensional coordinates of the first joint point and the three-dimensional attitude angle of the another joint point, the another joint point being a joint point except the first joint point and the second joint point in the target joint points; and determining the three-dimensional attitude of the virtual object corresponding to each frame of image according to the target three-dimensional coordinates of the target joint points and the three-dimensional attitude angles of the target joint points in each frame of image.

3. The method according to claim 1, wherein the correcting the first three-dimensional coordinates of the first joint point according to the first three-dimensional coordinates and the historical three-dimensional coordinates of the second joint point comprises:

determining a difference between the first three-dimensional coordinates and the historical three-dimensional coordinates of the second joint point in each dimension of the first coordinate system; and correcting a coordinate of the corresponding dimension in the first three-dimensional coordinates of the first joint point based on the difference corresponding to each dimension, to obtain a target three-dimensional coordinates of the first joint point.

4. The method according to claim 1, wherein the determining a filtered sliding window width of a two-dimensional attitude angle of a joint point according to the frame rate of the target video comprises:

determining an adjustment coefficient of a sliding window width according to the frame rate;

determining an initial sliding window width based on a product of the frame rate and the adjustment coefficient; and determining a larger value of the initial sliding window width and a preset sliding window width as the filtered sliding window width.

5. The method according to claim 1, wherein the determining three-dimensional attitude angles of target joint points of the target object in each frame of image, and first three-dimensional coordinates of a first joint point and a second joint point corresponding to each frame of image in a first coordinate system comprises:

determining the three-dimensional attitude angles of the target joint points in each frame of image through a three-dimensional attitude estimation model based on each frame of image;

determining a second three-dimensional coordinates of the first joint point corresponding to each frame of image in a second coordinate system, the second coordinate system being an image coordinate system corresponding to the target video;

determining the first three-dimensional coordinates of the first joint point according to the second three-dimensional coordinates and a coordinate conversion relationship, the coordinate conversion relationship being a conversion relationship between the first coordinate system and the second coordinate system; and determining the first three-dimensional coordinates of the second joint point according to the first three-dimensional coordinates of the first joint point and the three-dimensional attitude angle associated with the second joint point among the three-dimensional attitude angles of the target joint points.

6. The method according to claim 5, wherein the determining a second three-dimensional coordinates of the first joint point corresponding to each frame of image in a second coordinate system comprises:

for each frame of image, determining the second three-dimensional coordinates of the first joint point according to the three-dimensional attitude angle of the first joint point in each frame of image.

7. The method according to claim 5, wherein the determining a second three-dimensional coordinates of the first joint point corresponding to each frame of image in a second coordinate system comprises:

determining a two-dimensional coordinate of the first joint point in the second coordinate system according to an image position of the first joint point in each frame of image;

estimating a coordinate of the first joint point in a depth direction according to each frame of image and a related image of each frame of image; and determining the second three-dimensional coordinates of the first joint point based on the two-dimensional coordinate and the coordinate in the depth direction, the target video being a video acquired by a monocular image acquisition device, and the related image being a previous frame of image relative to each frame of image; or, the target video being one of two videos acquired by the binocular image acquisition device, and the related image being an image corresponding to each frame of image in the other video of the two videos.

8. The method according to claim 5, further comprising:

determining a first distance between two associated joint points according to second three-dimensional coordinates of the two associated joint points, the two associated joint points being two specified joint points with a parent-child relationship in the target joint points;

obtaining a reference distance between the two associated joint points in the first coordinate system; and determining the coordinate conversion relationship according to the first distance and the reference distance.

9. The method according to claim 1, wherein the obtaining a target video of a target object comprises:

obtaining at least two videos acquired by an image acquisition device with at least two acquisition perspectives, the at least two acquisition perspectives comprising a first perspective and at least a second perspective, and the target video being a video corresponding to the first perspective; and the determining three-dimensional attitude angles of target joint points of the target object in each frame of image comprising:

detecting initial joint points of the target object in each frame of image, the target joint points comprising the initial joint points;

determining initial three-dimensional attitude angles of the target joint points in each frame of image;

determining that there is no missing joint point in response to the number of the initial joint points being equal to a total number of the target joint points, and determining the initial three-dimensional attitude angles of the target joint points in each frame of image as the three-dimensional attitude angles of the target joint points in each frame of image; and determining that there is a missing joint point in response to the number of the initial joint points being less than the total number of the target joint points, and determining a three-dimensional attitude angle of the missing joint point according to an associated image corresponding to each frame of image in a non-target video, the non-target video being at least one video in the at least two videos except the target video; and determining the determined three-dimensional attitude angle of the missing joint point and the initial three-dimensional attitude angles of the initial joint points as the three-dimensional attitude angles of the target joint points in each frame of image.

10. The method according to claim 1, wherein before performing processing on each frame of image to obtain a three-dimensional attitude of a virtual object, associated with the target object, corresponding to each frame of image, the method further comprises:

determining optical flow information of the target object between adjacent frames in the target video, the optical flow information comprising an optical flow trajectory and an optical flow direction of the target object;

performing frame supplementation processing between the adjacent frames according to the optical flow information to obtain at least one frame supplementation image between the adjacent frames; and obtaining a frame-supplemented target video based on the target video and the frame supplementation images, each frame of image of the frame-supplemented target video being processed to obtain the three-dimensional attitude of the virtual object corresponding to each frame of image.

11. An electronic device, comprising a memory, a processor, and a computer program stored on the memory, the processor executing the computer program to implement:

obtaining a target video of a target object, the target video comprising at least one frame of image;

determining three-dimensional attitude angles of target joint points of the target object in each frame of image, and first three-dimensional coordinates of a first joint point and a second joint point corresponding to each frame of image in a first coordinate system, the first joint point and the second joint point being among target joint points, the first coordinate system being a coordinate system corresponding to a virtual object, and the first joint point being a root node among the target joint points;

determining a displacement deviation of the second joint point according to the first three-dimensional coordinates of the second joint point corresponding to each frame of image and a historical three-dimensional coordinates corresponding to a previous frame of image relative to each frame of image;

correcting the first three-dimensional coordinates of the first joint point according to the first three-dimensional coordinates and the historical three-dimensional coordinates of the second joint point in response to the displacement deviation being less than or equal to a threshold, to obtain a target three-dimensional coordinates of the first joint point;

determining a filtered sliding window width of a two-dimensional attitude angle of a joint point according to a frame rate of the target video;

filtering an attitude angle sequence of each target joint point in each dimension according to the filtered sliding window width to obtain a filtered attitude angle sequence, the attitude angle sequence of a target joint point in one dimension comprising a two-dimensional attitude angle of the target joint point in each frame of image of the target video in the dimension;

obtaining a filtered three-dimensional attitude angle of each target joint point in each frame of image according to the filtered attitude angle sequence in each dimension; and determining a three-dimensional attitude of the virtual object corresponding to each frame of image according to the target three-dimensional coordinates of the first joint point and the filtered three-dimensional attitude angles of the target joint points in each frame of image.

12. The electronic device according to claim 11, wherein the determining the three-dimensional attitude of the virtual object corresponding to each frame of image according to the target three-dimensional coordinates of the first joint point and the three-dimensional attitude angles of the target joint points in each frame of image comprises:

for each frame of image, determining a target three-dimensional coordinates of another joint point in each frame of image in the first coordinate system according to the target three-dimensional coordinates of the first joint point and the three-dimensional attitude angle of the another joint point, the another joint point being a joint point except the first joint point and the second joint point in the target joint points; and determining the three-dimensional attitude of the virtual object corresponding to each frame of image according to the target three-dimensional coordinates of the target joint points and the three-dimensional attitude angles of the target joint points in each frame of image.

13. The electronic device according to claim 11, wherein the correcting the first three-dimensional coordinates of the first joint point according to the first three-dimensional coordinates and the historical three-dimensional coordinates of the second joint point comprises:

determining a difference between the first three-dimensional coordinates and the historical three-dimensional coordinates of the second joint point in each dimension of the first coordinate system; and correcting a coordinate of the corresponding dimension in the first three-dimensional coordinates of the first joint point based on the difference corresponding to each dimension, to obtain a target three-dimensional coordinates of the first joint point.

14. The electronic device according to claim 11, wherein the determining a filtered sliding window width of a two-dimensional attitude angle of a joint point according to the frame rate of the target video comprises:

determining an adjustment coefficient of a sliding window width according to the frame rate;

determining an initial sliding window width based on a product of the frame rate and the adjustment coefficient; and determining a larger value of the initial sliding window width and a preset sliding window width as the filtered sliding window width.

15. The electronic device according to claim 11, wherein the determining three-dimensional attitude angles of target joint points of the target object in each frame of image, and first three-dimensional coordinates of a first joint point and a second joint point corresponding to each frame of image in a first coordinate system comprises:

determining the three-dimensional attitude angles of the target joint points in each frame of image through a three-dimensional attitude estimation model based on each frame of image;

determining a second three-dimensional coordinates of the first joint point corresponding to each frame of image in a second coordinate system, the second coordinate system being an image coordinate system corresponding to the target video;

determining the first three-dimensional coordinates of the first joint point according to the second three-dimensional coordinates and a coordinate conversion relationship, the coordinate conversion relationship being a conversion relationship between the first coordinate system and the second coordinate system; and determining the first three-dimensional coordinates of the second joint point according to the first three-dimensional coordinates of the first joint point and the three-dimensional attitude angle associated with the second joint point among the three-dimensional attitude angles of the target joint points.

16. The electronic device according to claim 15, wherein the determining a second three-dimensional coordinates of the first joint point corresponding to each frame of image in a second coordinate system comprises:

for each frame of image, determining the second three-dimensional coordinates of the first joint point according to the three-dimensional attitude angle of the first joint point in each frame of image.

17. The electronic device according to claim 15, wherein the determining a second three-dimensional coordinates of the first joint point corresponding to each frame of image in a second coordinate system comprises:

determining a two-dimensional coordinate of the first joint point in the second coordinate system according to an image position of the first joint point in each frame of image;

estimating a coordinate of the first joint point in a depth direction according to each frame of image and a related image of each frame of image; and determining the second three-dimensional coordinates of the first joint point based on the two-dimensional coordinate and the coordinate in the depth direction, the target video being a video acquired by a monocular image acquisition device, and the related image being a previous frame of image relative to each frame of image; or, the target video being one of two videos acquired by the binocular image acquisition device, and the related image being an image corresponding to each frame of image in the other video of the two videos.

18. The electronic device according to claim 15, wherein the processor is further configured to implement:

determining a first distance between two associated joint points according to second three-dimensional coordinates of the two associated joint points, the two associated joint points being two specified joint points with a parent-child relationship in the target joint points;

obtaining a reference distance between the two associated joint points in the first coordinate system; and determining the coordinate conversion relationship according to the first distance and the reference distance.

19. The electronic device according to claim 11, wherein before performing processing on each frame of image to obtain a three-dimensional attitude of a virtual object, associated with the target object, corresponding to each frame of image, the processor is further configured to implement:

determining optical flow information of the target object between adjacent frames in the target video, the optical flow information comprising an optical flow trajectory and an optical flow direction of the target object;

performing frame supplementation processing between the adjacent frames according to the optical flow information to obtain at least one frame supplementation image between the adjacent frames; and obtaining a frame-supplemented target video based on the target video and the frame supplementation images, each frame of image of the frame-supplemented target video being processed to obtain the three-dimensional attitude of the virtual object corresponding to each frame of image.

20. A non-transitory computer-readable storage medium, storing computer instructions, the computer instructions, when being executed by a processor, causing the processor to implement:

obtaining a target video of a target object, the target video comprising at least one frame of image;

determining three-dimensional attitude angles of target joint points of the target object in each frame of image, and first three-dimensional coordinates of a first joint point and a second joint point corresponding to each frame of image in a first coordinate system, the first joint point and the second joint point being among target joint points, the first coordinate system being a coordinate system corresponding to a virtual object, and the first joint point being a root node among the target joint points;

determining a displacement deviation of the second joint point according to the first three-dimensional coordinates of the second joint point corresponding to each frame of image and a historical three-dimensional coordinates corresponding to a previous frame of image relative to each frame of image;

correcting the first three-dimensional coordinates of the first joint point according to the first three-dimensional coordinates and the historical three-dimensional coordinates of the second joint point in response to the displacement deviation being less than or equal to a threshold, to obtain a target three-dimensional coordinates of the first joint point;

determining a filtered sliding window width of a two-dimensional attitude angle of a joint point according to a frame rate of the target video;

filtering an attitude angle sequence of each target joint point in each dimension according to the filtered sliding window width to obtain a filtered attitude angle sequence, the attitude angle sequence of a target joint point in one dimension comprising a two-dimensional attitude angle of the target joint point in each frame of image of the target video in the dimension;

obtaining a filtered three-dimensional attitude angle of each target joint point in each frame of image according to the filtered attitude angle sequence in each dimension; and determining a three-dimensional attitude of the virtual object corresponding to each frame of image according to the target three-dimensional coordinates of the first joint point and the filtered three-dimensional attitude angles of the target joint points in each frame of image.

* * * * *